United States Patent
Nishimura

(10) Patent No.: US 7,990,506 B2
(45) Date of Patent: Aug. 2, 2011

(54) LIQUID CRYSTAL DISPLAY DEVICE AND ELECTRONIC APPARATUS

(75) Inventor: Joji Nishimura, Matsumoto (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 12/393,635

(22) Filed: Feb. 26, 2009

(65) Prior Publication Data

US 2009/0231530 A1    Sep. 17, 2009

(30) Foreign Application Priority Data

Mar. 13, 2008    (JP) ................................. 2008-064053

(51) Int. Cl.
*G02F 1/1343*    (2006.01)

(52) U.S. Cl. ............ 349/141; 349/56; 349/84; 349/139; 349/142; 349/143

(58) Field of Classification Search .................... 349/56, 349/84, 139, 141, 142, 143
See application file for complete search history.

(56) References Cited

U.S. PATENT DOCUMENTS

| 7,773,180 B2 * | 8/2010 | Lee et al. ...................... 349/128 |
| 7,773,183 B2 * | 8/2010 | Son et al. ...................... 349/141 |
| 2007/0176872 A1 | 8/2007 | Kazuyoshi et al. |

FOREIGN PATENT DOCUMENTS

| JP | A-05-108023 | 4/1993 |
| JP | B-3607272 | 1/2005 |
| JP | A-2006-317905 | 11/2006 |
| JP | A-2007-079525 | 3/2007 |
| JP | A-2007-178737 | 7/2007 |
| JP | A-2007-178739 | 7/2007 |

* cited by examiner

Primary Examiner — Jennifer Doan
(74) Attorney, Agent, or Firm — K&L Gates LLP

(57) ABSTRACT

A liquid crystal display device includes a first substrate and a second substrate opposed to each other; a liquid crystal layer interposed between the first substrate and the second substrate; a plurality of displaying pixel electrodes disposed on a surface of the first substrate close to the liquid crystal layer; a plurality of viewing-angle controlling pixel electrodes disposed adjacent to the plurality of displaying pixel electrodes on the side of the first substrate close to the liquid crystal layer; a viewing angle control area controlling a viewing angle in a direction tilted from a normal line of the first substrate by the use of the plurality of viewing-angle controlling pixel electrodes; and a driving circuit supplying an image signal for displaying a plurality of patterns in the viewing angle control area to the plurality of viewing-angle controlling pixel electrodes.

11 Claims, 12 Drawing Sheets

LIQUID CRYSTAL DISPLAY DEVICE AND ELECTRONIC APPARATUS

BACKGROUND

1. Technical Field

The present invention relates to a liquid crystal display device and an electronic apparatus.

2. Related Art

Liquid crystal display devices had a problem with a narrow viewing angle in the past and a wide viewing angle characteristic has been required therefor. Particularly, this problem is remarkable in applications for televisions or car navigation apparatuses or digital cameras of which display plural persons view. On the contrary, when a user alone views the display, there is a need for not allowing the other persons to view the display. In this case, a narrow viewing angle characteristic has been required. This is true, for example, in applications for notebook PCs or mobile phones used in public places. In recent years, a need for switching the wideness and narrowness of a viewing angle depending on the usage of the same apparatus has increased in cases where TV programs are watched with notebook PCs, games are played with mobile phones, or the like.

For this need, JP-A-5-108023 suggested a method of controlling a viewing angle characteristic by providing a viewing-angle controlling liquid crystal panel in addition to a displaying liquid crystal panel and controlling a voltage supplied to the viewing-angle controlling liquid crystal panel. JP-A-2007-79525 and JP-A-2007-178737 suggested a method of controlling a viewing angle characteristic by providing viewing-angle controlling sub pixels in addition to displaying sub pixels of R (red), G (green), and B (blue) and controlling a voltage supplied to the viewing-angle controlling sub pixels.

However, the method disclosed in JP-A-5-108023 caused a problem in that the thickness of a module is greatly increased due to the addition of the viewing-angle controlling liquid crystal panel. In the method disclosed in JP-A-2007-79525 and JP-A-2007-178737, the thickness is not increased since the viewing-angle controlling sub pixels are provided, but the display of a wide angle could not be completely suppressed by the use of only the viewing-angle controlling sub pixels having the viewing angle control performance smaller than normal displaying sub pixels. That is, the viewing-angle controlling sub pixels cause leakage of light in a wide-angle direction using a change in alignment status of liquid crystal molecules in a direction perpendicular to a substrate, thereby reducing the contrast as viewed in a tilted direction. However, since the light emitted from the viewing-angle controlling sub pixels is weak and has uniform brightness as a whole, the outline of an image is displayed as it is and thus it is not possible to accomplish a sufficient viewing-angle control effect.

SUMMARY

An advantage of some aspects of the invention is that it provides a liquid crystal display device and an electronic apparatus having a small thickness and a high viewing angle control effect.

According to an aspect of the invention, there is provided a liquid crystal display device including: a first substrate and a second substrate opposed to each other; a liquid crystal layer interposed between the first substrate and the second substrate; a plurality of displaying pixel electrodes disposed on a surface of the first substrate close to the liquid crystal layer; a plurality of viewing-angle controlling pixel electrodes disposed adjacent to the plurality of displaying pixel electrodes on the side of the first substrate close to the liquid crystal layer, a viewing angle control area controlling a viewing angle in a direction tilted from a normal line of the first substrate by the use of the plurality of viewing-angle controlling pixel electrodes; and a driving circuit supplying an image signal for displaying a plurality of patterns in the viewing angle control area to the plurality of viewing-angle controlling pixel electrodes.

Specifically, according to another aspect of the invention, there is provided a liquid crystal display device including: a first substrate and a second substrate opposed to each other; a liquid crystal layer interposed between the first substrate and the second substrate; a first polarizing film disposed on a surface of the first substrate opposite to the liquid crystal layer; a second polarizing film being disposed on a surface of the second substrate opposite to the liquid crystal layer and having an optical axis perpendicular to an optical axis of the first polarizing film; a plurality of displaying pixel electrodes disposed on a surface of the first substrate close to the liquid crystal layer; a plurality of viewing-angle controlling pixel electrodes disposed adjacent to the plurality of displaying pixel electrodes on the side of the first substrate close to the liquid crystal layer; a viewing angle control area for controlling an alignment status of the liquid crystal layer in an in-plane direction including a normal line of the first substrate and the optical axis of the first polarizing film by the use of the plurality of viewing-angle controlling pixel electrodes; and a driving circuit supplying an image signal for displaying a plurality of patterns in the viewing angle control area to the plurality of viewing-angle controlling pixel electrodes.

According to this configuration, since an image including plural patterns formed by the viewing angle control area overlaps with an image in a wide-angle direction formed by the displaying pixel electrodes, it is possible to accomplish an excellent viewing angle control effect, in comparison with the past case where the viewing angle is controlled with an entire-white single pattern. That is, in JP-A-2007-79525 and JP-A-2007-178737, since the light emitted from the viewing-angle controlling sub pixels has the uniform brightness as a whole, the contrast of the image in the wide-angle direction is decreased, but the outline of the image maintains the original shape. Accordingly, when a bright image is displayed, the outline of the image is dimly displayed in the light emitted from the viewing-angle controlling sub pixels, thereby not accomplishing the sufficient viewing angle control effect. On the contrary, in the liquid crystal display devices having the above-mentioned configuration, the viewing angle is controlled with plural patterns having different intensity of light or colors. Accordingly, for example, when plural bright and dark patterns having different intensity are displayed, the gray scale of an image varies every area where the patterns overlap and the outline of the image gets greatly dim at the boundaries of the bright and dark patterns. When patterned different colors are displayed, the color of the image varies every area where the patterns overlap and the outline or color of the image gets greatly dim. Therefore, even when the intensity of light emitted from the viewing angle control area is small, it is possible to reduce the visibility of the image in the wide-angle direction.

When patterns are actually displayed in the viewing angle control area, the liquid crystal is not in a normally ON state but repeats the ON and OFF states in driving, and the liquid crystal is attracted depending on a frame frequency and the display image varies in time series. Therefore, when the same pattern is displayed, the image varies instantaneously. As a result, the "pattern" in the invention means a pattern displayed in the viewing angle control area within one frame period. The expression of "plural patterns are displayed in the viewing angle control area" means that plural patterns are displayed in the viewing angle control area within one frame period.

The "optical axis of the polarizing film" in the invention means a transmission axis or an absorption axis (a reflection axis in case of a reflective polarizing film) of the polarizing film. By controlling the alignment status of the liquid crystal molecules in the plane including the transmission axis or the absorption axis of the polarizing film and the normal line of the substrate, it is possible to reduce the contrast in the wide-angle direction without reducing the contrast of display in the normal direction of the substrate In the invention, the patterns preferably have a size visible with naked eyes. According to this configuration, since the attention of an observer can be attracted by the color or shape of the patterns, it is possible to further reduce the visibility of an image. Here, the expression of "visible with naked eyes" means that it is visible when an observer directly views the entire screen in a normal use and excludes a case where a part of the image display area is enlarged and observed with a microscope, etc. 2 mm is assumed as the size visible with the naked eyes. In spite of individual differences, the size of about 2 mm is considered as being clearly visible with the naked eyes. When the size of pattern is too great, the effect of causing the outline or color to be dim is reduced, which is not desirable. Therefore, it is preferable that the maximum size of pattern is limited to a predetermined size (for example, 20 mm or less) and plural patterns are displayed in that range.

In the above-mentioned configuration, preferably, the liquid crystal display device further includes: a common electrode opposed to the plurality of displaying pixel electrodes and the plurality of viewing-angle controlling pixel electrodes with an insulating film interposed therebetween on the side of the first substrate close to the liquid crystal layer; a first alignment film disposed on a surface of the first substrate in contact with the liquid crystal layer; and a second alignment film disposed on a surface of the second substrate in contact with the liquid crystal layer. Here, an alignment direction of the first alignment film and an alignment direction of the second alignment film may be parallel to the optical axis of the first polarizing film. The electrode, which is closer to the liquid crystal layer, of the viewing-angle controlling pixel electrodes and the common electrode may be provided with a plurality of first band-like electrodes extending in a direction perpendicular to the optical axis of the first polarizing film at positions overlapping with the viewing-angle controlling pixel electrodes and the electrode, which is closer to the liquid crystal layer, of the displaying pixel electrodes and the common electrode may be provided with a plurality of second band-like electrodes extending in a direction intersecting the optical axis of the first polarizing film at positions overlapping with the displaying pixel electrodes.

According to this configuration, it is possible to change the alignment status of the liquid crystal molecules in the plane including the optical axis of the first polarizing film and the normal line of the substrates by the use of an electric field generated between the viewing-angle controlling pixel electrodes and the common electrode. When the alignment status of the liquid crystal molecules is changed in the plane, the image display in the normal direction of the substrates is not changed, but light leakage (emission of light) occurs in the direction obliquely tilted from the normal line direction to reduce the contrast of the image as viewed in the tilted direction. When the viewing angle is not controlled, the alignment status of the liquid crystal molecules is controlled in a plane parallel to the substrates by the use of the electric field generated between the displaying pixel electrodes and the common electrode, thereby displaying an image with a wide viewing angle.

In the above-mentioned configuration, preferably, the plurality of viewing-angle controlling pixel electrodes includes a first viewing-angle controlling pixel electrode and a second viewing-angle controlling pixel electrode. In addition, a voltage-transmittance characteristic of the liquid crystal layer located at a position overlapping with the first viewing-angle controlling pixel electrode and a voltage-transmittance characteristic of the liquid crystal layer located at a position overlapping with the second viewing-angle controlling pixel electrode are different from each other. According to this configuration, it is possible to display plural patterns having different intensity of light by the use of a common driving voltage. In this case, since it is not necessary to control the driving voltage in the unit of viewing-angle controlling pixel electrodes, it is possible to simplify the driving circuit and to reduce the number of wirings from the driving circuit to the viewing angle control area.

Here, the "voltage-transmittance characteristic" means a relation between the driving voltage supplied to the pixel electrodes and the transmittance of the liquid crystal layer. The following methods can be used as the method of controlling the voltage-transmittance characteristic.

The first method may employ a configuration in which a ratio L/S of the width L of the first band-like electrodes to the width S of slits between the plurality of first band-like electrodes different in the first band-like electrode disposed at the position overlapping with the first viewing-angle controlling pixel electrode and the first band-like electrode disposed at the position overlapping with the second viewing-angle controlling pixel electrode. Since the voltage-transmittance characteristic varies depending on the ratio L/S, it is possible to control the intensity of light by controlling the ratio L/S.

The second method may employ a configuration in which the thickness of the insulating film located at the position overlapping with the first viewing-angle controlling pixel electrode and the thickness of the insulating film located at the position overlapping with the second viewing-angle controlling pixel electrode are different from each other. Since the voltage-transmittance characteristic varies depending on the thickness of the insulating film, it is possible to control the intensity of light by controlling the thickness of the insulating film.

The third method may employ a configuration in which a liquid-crystal-layer thickness adjusting layer allowing the thickness of the liquid crystal layer located at the position overlapping with the first viewing-angle controlling pixel electrode and the thickness of the liquid crystal layer located at the position overlapping with the second viewing-angle controlling pixel electrode to be different from each other is disposed between the first substrate and the second substrate. Since the voltage-transmittance characteristic varies depending on the thickness of the liquid crystal layer, it is possible to control the intensity of light by controlling the thickness of the liquid crystal layer. Here, the liquid-crystal-layer thickness adjusting layer may employ an overcoating layer disposed on a color filter layer. Depending on existence of the overcoating layer or by adjusting the thickness of the overcoating layer, the thickness of the liquid crystal layer located at the position overlapping with the first viewing-angle controlling pixel electrode can be made to be different from the thickness of the liquid crystal layer located at the position overlapping with the second viewing-angle controlling pixel electrode.

In the above-mentioned configuration, preferably, a coloring layer disposed at positions overlapping with the viewing-angle controlling pixel electrodes is provided between the first substrate and the second substrate. According to this configuration, it is possible to display plural patterns having different colors of light by the use of the common driving voltage. The colors of the patterns can be controlled by the color of the coloring layer or the existence or non-existence of the coloring layer. In this case, since it is not necessary to control the driving voltage in the unit of areas, it is possible to simplify the driving circuit and to reduce the number of wirings from the driving circuit to the viewing angle control area.

The color of the coloring layer can be selected arbitrarily. For example, coloring layers (for example, coloring layers of three primary colors of red, green, and blue) disposed to correspond to the displaying pixel electrodes may be disposed to correspond to the viewing-angle controlling pixel electrodes, or coloring layers (for example, black, emerald green, orange, yellow, and gold) other than the coloring layers disposed to correspond to the displaying pixel electrodes may be disposed to correspond to the viewing-angle controlling pixel electrode.

In the above-mentioned configuration, preferably, the plurality of viewing-angle controlling pixel electrodes are connected to each other and a voltage switching element switching a voltage supply is connected to the plurality of viewing-angle controlling pixel electrodes connected to each other. According to this configuration, since the driving voltage can be used in common to the plural viewing-angle controlling pixel electrodes, it is possible to simplify the driving circuit and to reduce the number of wirings from the driving circuit to the viewing angle control area.

In the above-mentioned configuration, preferably, the plurality of viewing-angle controlling pixel electrodes is arranged in an image display area with a constant gap. According to this configuration, it is possible uniformly arrange the viewing-angle controlling pixel electrodes in the entire image display area. Therefore, the problem that the viewing angle control function is deteriorated in a specific area does not occur. Here, the gap with which the viewing-angle controlling pixel electrodes are arranged can be set arbitrarily. For example, the displaying pixel electrodes and the viewing-angle controlling pixel electrodes may be arranged alternately in one direction, or units each having the adjacent plural displaying pixel electrodes and one viewing-angle controlling pixel electrode may be two-dimensionally (in a matrix shape) arranged in the image display area. In the latter, the viewing-angle controlling pixel electrodes are preferably disposed every three displaying pixel electrodes, that is, every pixel. Accordingly, it is possible to accomplish an excellent viewing angle control effect in the entire image display area.

In the above-mentioned configuration, preferably, the image displayed in the viewing angle control area is an image in which the plurality of patterns having the same shape is arranged with a predetermined period. According to this configuration, it is possible to more attract an observer's attention in comparison with the case where the patterns are arranged in random shapes or random periods. Accordingly, it is possible to further reduce the visibility of a displaying image.

The periodic patterns may employ a checker pattern or a stripe pattern. The checker pattern means an image in which plural rectangular patterns having different light intensity or different colors are arranged to cross each other. The stripe pattern means an image in which plural line-like patterns having different light intensity or different colors are arranged alternately in one direction.

When the checker pattern is displayed, it is preferable that the length of each side of the rectangular patterns is in the range of 2 mm to 20 mm. When the size of the patterns is too small, they are not visible with naked eyes and thus do not attract an observer's attraction. On the contrary, when the size of the patterns is too great, the effect of causing the outline or color to be dim is reduced, which is not desirable. Therefore, it is preferable that the pattern size is limited to a predetermined range (for example, from 2 mm to 20 mm) and plural patterns are displayed in the range. Similarly, when the stripe pattern is displayed, it is preferable that the line width of the line-like patterns is in the range of 2 mm to 20 mm.

According to another aspect of the invention, there is provided an electronic apparatus having the above-mentioned liquid crystal display device. According to this configuration, it is possible to embody an electronic apparatus having a liquid crystal display unit with an excellent function of switching the viewing angle between wide and narrow and capable of being applied to various environment or applications.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
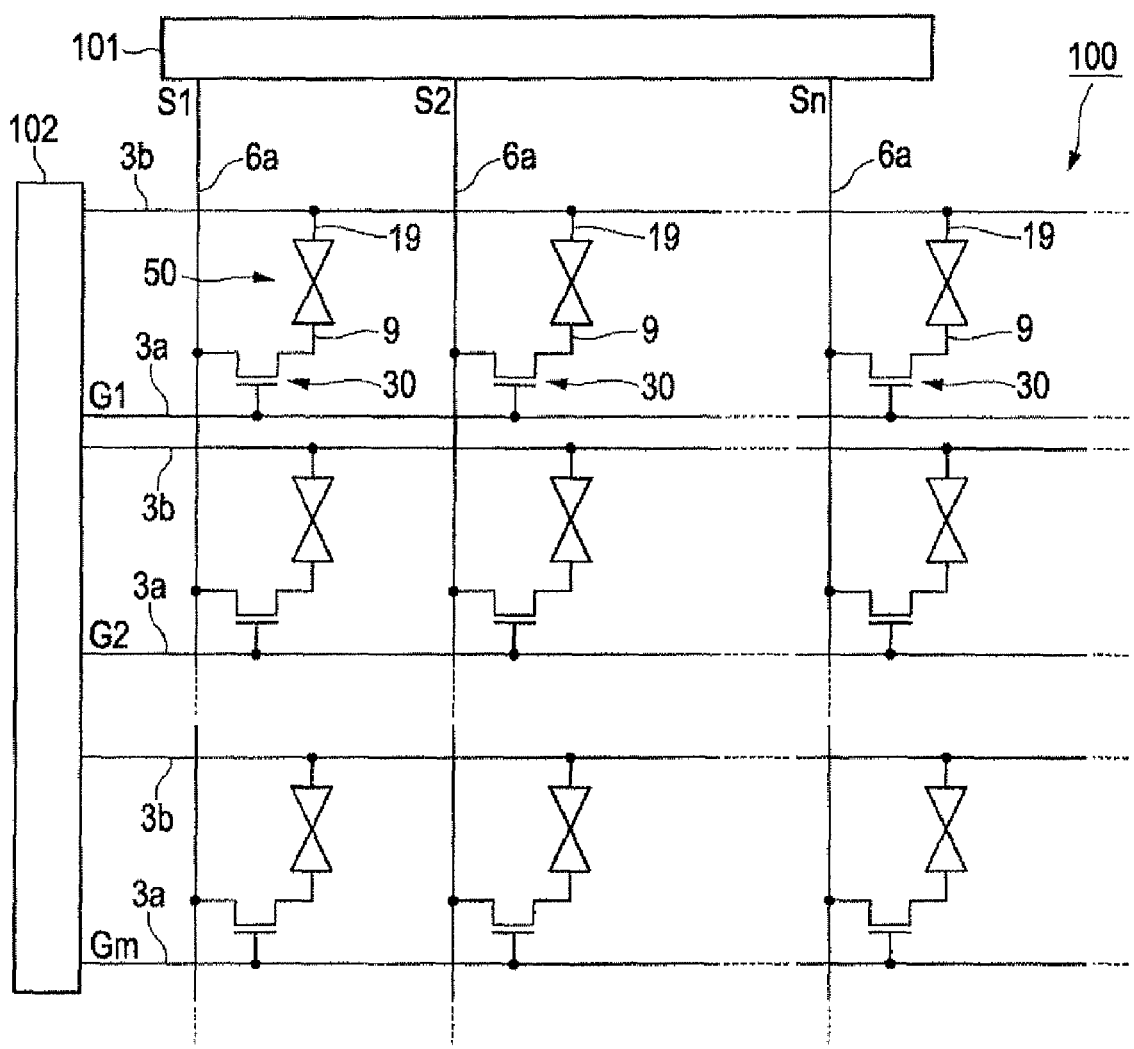
FIG. 1 is an equivalent circuit diagram of a liquid crystal display device according to a first embodiment of the invention.

Hereinafter, a liquid crystal display device according to a first embodiment of the invention will be described with reference to the accompanying drawings. In the following description, the arrangements of constituent members will be explained using an XYZ orthogonal coordinate system. In this embodiment, for example, the X axis direction is set to an extension direction of scanning lines, the Y axis direction is set to an extension direction of data lines, and the z axis direction is set to an observer's observation direction of an image display area. In the drawings, enlarged or reduced scales of layers or constituent members are different so as to recognize the layers or constituent members in the drawings.

The liquid crystal display device according to this embodiment employs a so-called FFS (Fringe Field Switching) system among systems for displaying an image by applying an electric field in a direction substantially parallel to a substrate plane to liquid crystal molecules to control alignment of the liquid crystal molecules. The liquid crystal display device according to this embodiment is a color liquid crystal display device having a color filter layer on a substrate and has a configuration in which one pixel includes three displaying sub pixels outputting light beams of R (Red), G (Green), and B (Blue) and one viewing-angle controlling sub pixel adjacent to the displaying sub pixels. In the following description, an area serving as a minimum unit for displaying an image is referred to as a "sub pixel area" and an area including plural pixels is referred to as an "image display area."

FIG. 1 is a circuit diagram illustrating plural sub pixel areas formed in a matrix shape to constitute the liquid crystal display device 100 according to this embodiment. Pixel electrodes 9 and TFTs 30 switching and controlling the pixel electrodes 9 are formed in the plural sub pixel areas formed in a matrix shape to constitute an image display area of the liquid crystal display device 100. A liquid crystal layer 50 is interposed between the pixel electrodes 9 and a common electrode 19. The common electrode 19 is electrically connected to common lines 3b extending from a scanning line driving circuit 102 and is maintained in a potential common to the plural sub pixels. Data lines 6a extending from a data line driving circuit 101 are electrically connected to the sources of the TFTs 30. The data line driving circuit 101 supplies image signals S1, S2, ..., and Sn to the sub pixels through the data lines 6a. The image signals S1 to Sn may be supplied line-sequentially in this order or may be supplied to plural data lines 6a adjacent to each other in the unit of groups.

The gates of the TFTs 30 are electrically connected to scanning lines 3a extending from the scanning line driving circuit 102. Scanning signals G1, G2, ..., and Gm supplied in a pulse-like manner from the scanning line driving circuit 102 to the scanning lines 3a at a predetermined time are supplied to the gates of the TFTs 30 line-sequentially in this order. The pixel electrodes 9 are electrically connected to the drains of the TFTs 30. By allowing the TFTs 30 as switching elements to be turned on for only a predetermined time in response to the input of the scanning signals G1, G2, ..., and Gm, the image signals S1, S2, ..., and Sn supplied from the data lines 6a are written to the pixel electrodes 9 at a predetermined time. The image signals S1, S2, ..., and Sn of a predetermined level written to the liquid crystal through the pixel electrodes 9 are held between the pixel electrodes 9 and the common electrode 19 opposed thereto with the liquid crystal therebetween for a predetermined time.

Figure 2:
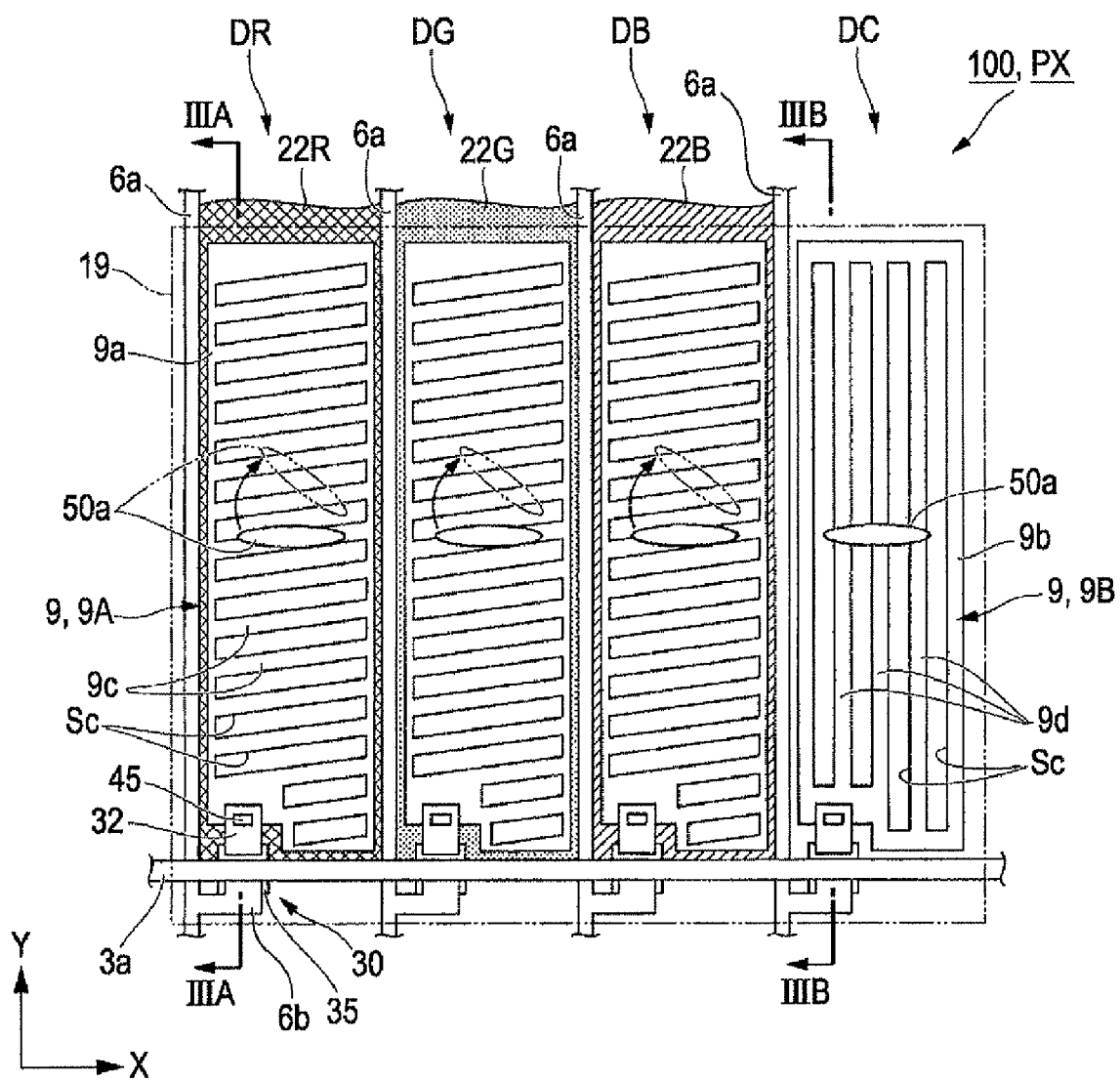
FIG. 2 is a plan view illustrating a pixel of the liquid crystal display device according to the first embodiment of the invention.

FIG. 2 is a plan view illustrating a pixel PX in the image display area of the liquid crystal display device 100. The image display area of the liquid crystal display device 100 is provided with plural scanning lines 3a extending in the x axis direction and plural data lines 6a extending in the Y axis direction. Rectangular areas surrounded with the scanning lines 3a and the data lines 6a in a plan view are sub pixels DR, DG, DB, and DC and the plural sub pixels DR, DG, DB, and DC arranged in the x axis direction constitute one pixel PX.

Each pixel PX includes displaying sub pixels DR, DG, and DB contributing to the display of an image and a viewing-angle controlling sub pixel DC used to prevent the observation in a wide-angle direction (direction obliquely tilted from a substrate normal line). One coloring layer (color filter) of one color of three primary colors is disposed to correspond to one displaying sub pixel and any color display is made by three displaying sub pixels DR, DG, and DB. In this embodiment, a red displaying sub pixel DR provided with a red coloring layer 22R, a green displaying sub pixel DG provided with a green coloring layer 22G, and a blue displaying sub pixel DB provided with a blue coloring layer 22B are disposed, but the viewing-angle controlling sub pixel DC is provided with no coloring layer.

The respective coloring layers 22R, 22G, and 22B are formed in a stripe shape extending in the Y axis direction, are disposed in plural sub pixels in the extension direction thereof, and are arranged periodically in the X axis direction.

A displaying pixel electrode 9A having plural slits Sc formed therein to form a substantial ladder shape in a plan view and being longitudinal in the Y axis direction is formed in each of the displaying sub pixels DR, DG, and DB. The scanning lines 3a and the data lines 6a are arranged to surround the displaying pixel electrodes 9A. The TFTs 30 as switching elements are formed in the vicinity of intersections between the scanning lines 3a and the data lines 6a and the TFTs 30 are electrically connected to the data lines 6a and the displaying pixel electrodes 9A. The common electrode 19 having a substantially rectangular shape is formed at a position almost overlapping with the displaying pixel electrodes 9A in a plan view.

The displaying pixel electrodes 9A are a conductive film formed of a transparent conductive material such as ITO. The slits Sc of the displaying pixel electrodes 9A are arranged in the extension direction of the data lines 6a with a constant gap. In this embodiment, 15 slits Sc are formed in the displaying pixel electrode 9A of one sub pixel. The slits Sc extend in a direction (a tilted direction in the drawing) intersecting both the scanning lines 3a and the data lines 6a. The slits Sc have substantially the same width and are parallel to each other. Each displaying pixel electrode 9A includes plural (14 in the drawing) band-like electrodes (second band-like electrodes) 9c formed by the plural slits Sc and a frame portion 9a having a substantially rectangular frame shape in a plan view and being connected to both ends of the band-like electrodes 9c. Since the slits Sc have the same width and are arranged in the Y axis direction with a constant gap, the band-like electrodes 9c have the same width and are arranged in the Y axis direction with a constant gap.

A viewing-angle controlling pixel electrode 9B having plural slits Sc formed therein to form a substantial ladder shape in a plan view and being longitudinal in the Y axis direction is formed in the viewing-angle controlling sub pixel DC. The scanning line 3a and the data line 6a are arranged to surround the viewing-angle controlling pixel electrode 9B. The TFT 30 as a switching element is formed in the vicinity of the intersection between the scanning line 3a and the data line 6a and the TFT 30 is electrically connected to the data line 6a and the viewing-angle controlling pixel electrode 9B. The common electrode 19 having a substantially rectangular shape is formed at a position almost overlapping with the viewing-angle controlling pixel electrode 9B in a plan view.

The viewing-angle controlling pixel electrode 9B is a conductive film formed of a transparent conductive material such as ITO. The slits Sc of the viewing-angle controlling pixel electrode 9B are arranged in the extension direction of the scanning line 3a with a constant gap. In this embodiment, 4 slits Sc are formed in the viewing angle controlling pixel electrode 9B of one sub pixel. The slits Sc extend in parallel to the data line 6a. The slits Sc have substantially the same width and are parallel to each other. The viewing-angle controlling pixel electrode 9B includes plural (3 in the drawing) band-like electrodes (first band-like electrodes) 9d formed by the plural slits Sc and a frame portion 9b having a substantially rectangular frame shape in a plan view and being connected to both ends of the band-like electrodes 9d. Since the slits Sc have the same width and are arranged in the X axis direction with a constant gap, the band-like electrodes 9d have the same width and are arranged in the X axis direction with a constant gap.

The common electrode 19 is a conductive film having a rectangular shape in a plan view and being formed of a transparent conductive material such as ITO. Although not shown, the common electrode 19 is formed monolithic with common lines extending in parallel to the scanning lines 3a and thus the common electrode 19 is electrically connected to the common lines. The common lines and the common electrode 19 may be formed of different conductive films, respectively, and may be then electrically connected to each other. A transverse electric field in a direction perpendicular to the extension direction of the band-like electrodes 9c and 9d is generated between the common electrode 19 and the pixel electrodes 9 and the alignment status of the liquid crystal molecules 50a is changed by the transverse electric field.

Each TFT 30 includes a semiconductor layer 35 formed of an island-shaped amorphous silicon film partially formed on the scanning lines 3a, a source electrode 31 being branched from the data lines 6a and extending onto the semiconductor layer 35, and a rectangular drain electrode 32 extending from the semiconductor layer 35 to the formation area of the pixel electrode 9. The scanning lines 3a serve as a gate electrode of the TFT 30 at a position opposed to the semiconductor layer 35. The drain electrode 32 and the pixel electrode 9 are electrically connected to each other through a pixel contact hole 45 formed at a position where both two-dimensionally overlap with each other. An area of each sub pixel area where the pixel electrode 9 and the common electrode 19 two-dimensionally overlap with each other serves as a capacitor of the corresponding sub pixel area. Therefore, it is not necessary to provide an additional storage capacitor, thereby accomplishing a high aperture ratio.

Figure 3A:
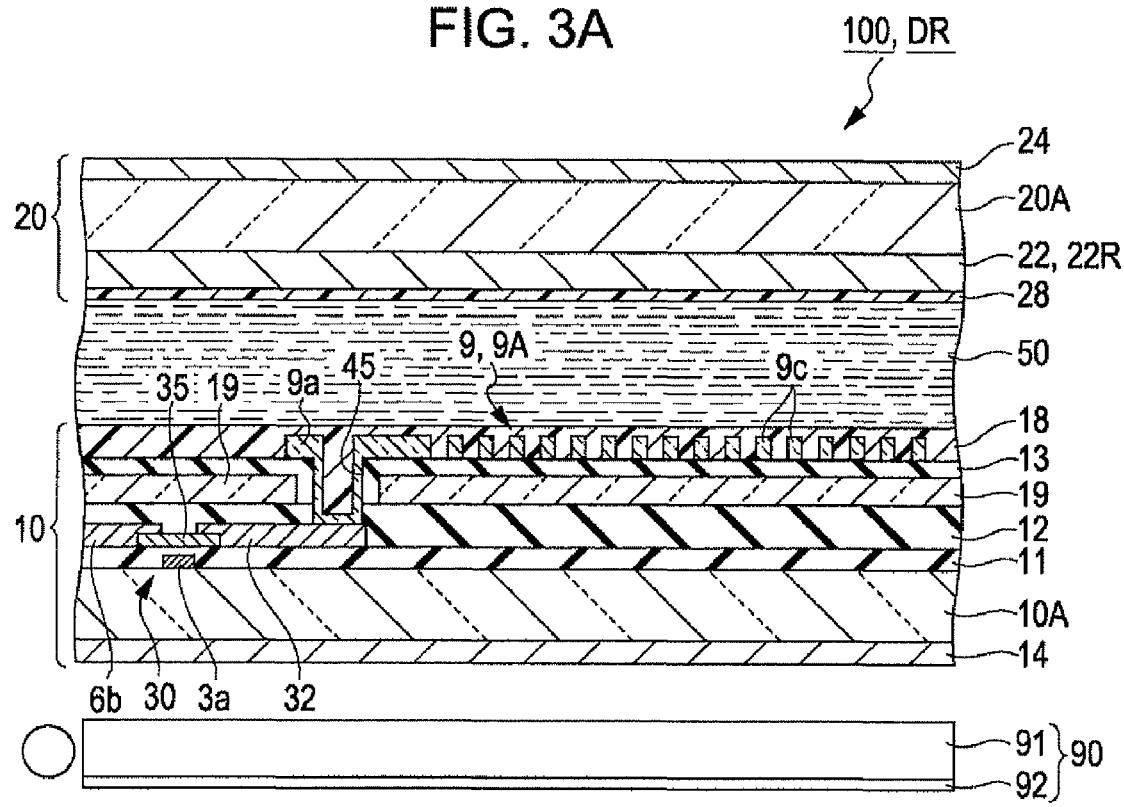
FIG. 3A is a sectional view taken along line IIIA-IIIA' of FIG. 2
Figure 3B:
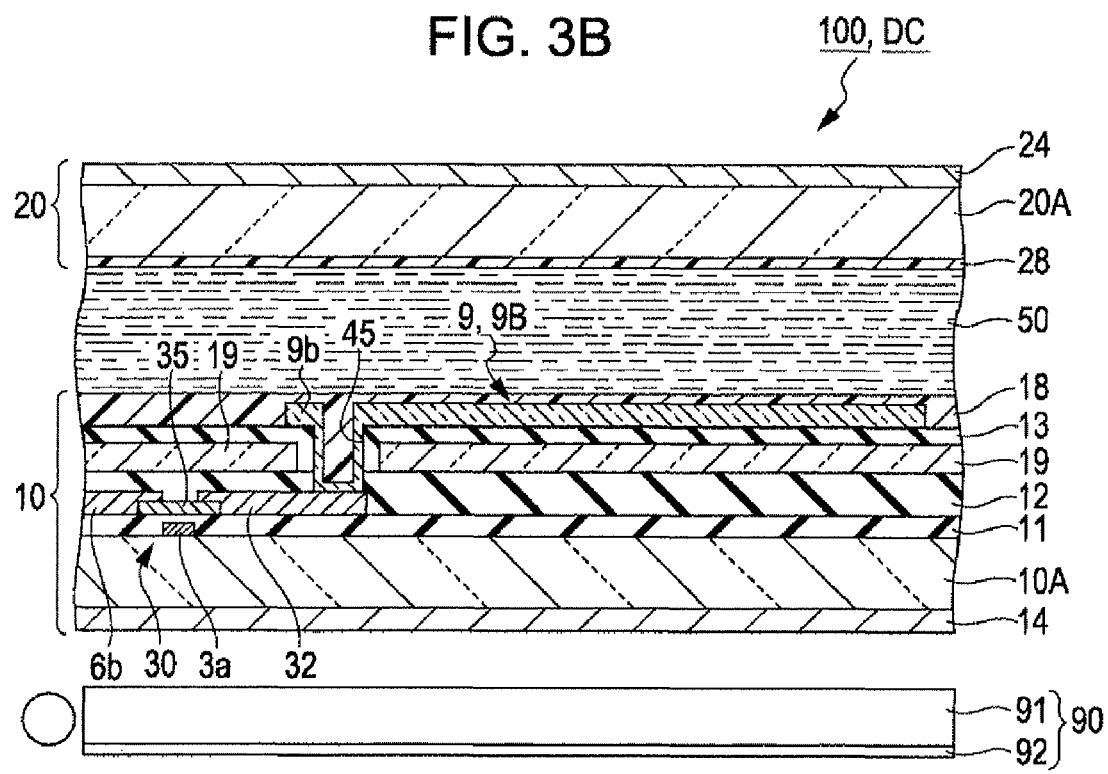
FIG. 3B is a sectional view taken along line IIIB-IIIB' of FIG. 2.

FIGS. 3A and 3B are sectional views illustrating one pixel in the liquid crystal display device 100. FIG. 3A is a sectional view (sectional view taken along line IIIA-IIIA' of FIG. 2) of a displaying sub pixel DR and FIG. 3B is a sectional view (sectional view taken along line IIIB-IIIB' of FIG. 2) of a viewing-angle controlling sub pixel DC. Although only the sectional view of the red displaying sub pixel DR is shown in FIG. 3A, the sectional views of the green displaying sub pixel DG and the blue displaying sub pixel DB are equal thereto, except that the colors of the coloring layers are different therefrom.

The liquid crystal display device 100 includes a TFT array substrate 10, a counter substrate 20 opposed to the TFT array substrate 10, a liquid crystal layer 50 interposed between the TFT array substrate 10 and the counter substrate 20, a first polarizing film 14 disposed on the outer surface side (on the opposite side of the liquid crystal layer 50) of the TFT array substrate 10, a second polarizing film 24 disposed on the outer surface side of the counter substrate 20, and a lighting device 90 disposed on the outer surface side of the first polarizing film 14. Illumination light is applied from the outer surface side of the first polarizing film 14 by the lighting device 90 having a light guide plate 91 and a reflecting film 92.

The TFT array substrate 10 has a light-transmitting substrate body 10A such as glass, quartz, or plastic as a base. The scanning lines 3a are formed on the inner surface side (side close to the liquid crystal layer 50) of the substrate body 10A and a gate insulating film 11 formed of a transparent insulating film such as silicon oxide is formed to cover the scanning lines 3a.

The semiconductor layer 35 of amorphous silicon is formed on the gate insulating film 11 and the source electrodes 6b and the drain electrodes 32 are disposed to be partially placed on the semiconductor layer 35. The semiconductor layer 35 is opposed to the scanning lines 3a with the gate insulating film 11 interposed therebetween and the scanning lines 3a forms the gate electrodes of the TFTs 30 in the opposed regions.

A first interlayer insulating film 12 formed of silicon oxide, etc. is formed to cover the semiconductor layer 35, the source electrodes 6b, and the drain electrodes 32. The common electrode 19 of a two-dimensional beta shape formed of a transparent conductive material such as ITO is formed on the first interlayer insulating film 12. A second interlayer insulating film 13 formed of silicon oxide, etc. is formed to cover the common electrode 19 and the pixel electrodes 9 (the displaying pixel electrodes 9A and the viewing-angle controlling pixel electrodes 9B) formed of a transparent conductive material such as ITO are formed in a pattern on the second interlayer insulating film 13.

A pixel contact hole 45 penetrating the first interlayer insulating film 12 and the second interlayer insulating film 13 and reaching the drain electrode 32 is formed. A part of the pixel electrode 9 is buried in the pixel contact hole 45 and thus the pixel electrode 9 and the drain electrode 32 are electrically connected to each other. An opening is formed in the common electrode 19 to correspond to the formation region of the pixel contact hole 45 and thus the common electrode 19 and the pixel electrode 9 do not come in contact with each other. An alignment film 18 formed of polyimide, etc. is formed in an area on the second interlayer insulating film 13 covering the pixel electrode 9.

The counter substrate 20 has a light-transmitting substrate body 20A formed of glass, quartz, plastic, or the like as a base. A color filter layer 22 and an alignment film 28 formed of polyimide, etc. are stacked on the inner surface (a side close to the liquid crystal layer 50) of the substrate body 20A. Coloring layers having different colors are disposed on the color filter layer 22 to correspond to the displaying sub pixels. Since FIG. 3A is a sectional view of the red displaying sub pixel DR, the red coloring layer 22R is disposed as the color filter layer 22. No coloring layer is disposed in the viewing-angle controlling sub pixel DC shown in FIG. 3B. Accordingly, the thickness of the liquid crystal layer 50 is greater than that on the displaying sub pixel having the coloring layer.

Figure 4:
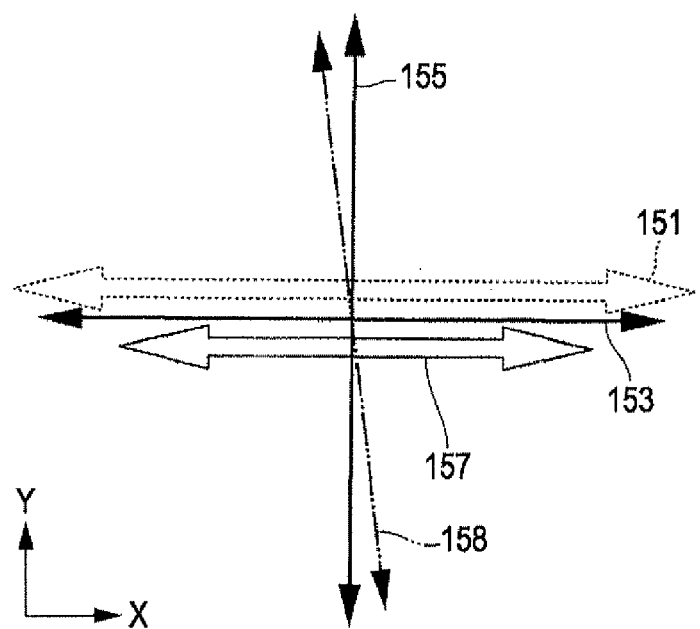
FIG. 4 is a diagram illustrating an arrangement relation among optical axes in the liquid crystal display device.

FIG. 4 is a diagram illustrating an arrangement relation of optical axes of optical elements constituting the liquid crystal display device 100. The transmission axis 155 of the polarizing film 14 is parallel to the Y axis. The transmission axis 153 of the polarizing film 24 is parallel to the X axis. The alignment films 18 and 28 are subjected to a rubbing process (alignment process) in the same direction in a plan view and this direction is a rubbing direction 151. The rubbing direction (alignment direction) 151 is parallel to the X axis. The extension direction of the band-like electrodes 9d of the viewing-angle controlling pixel electrode 9B is parallel to the Y axis. Accordingly, a direction 157 of the transverse electric field generated between the viewing-angle controlling pixel electrode 9B and the common electrode 19 is parallel to the x axis. The extension direction of the band-like electrodes 9c of the displaying pixel electrode 9A forms an angle of about 10° to 30° with respect to the X axis direction in the counterclockwise direction. Therefore, a direction 158 of the transverse electric field generated between the displaying pixel electrode 9A and the common electrode 19 forms an angle of about 10° to 30° with respect to the Y axis in the counterclockwise direction. The transmission axis 153 of the polarizing film 24 and the transmission axis 155 of the polarizing film 14 can be parallel or perpendicular to the rubbing direction and may have a direction obtained by rotating from the angle shown in FIG. 4 by 90°. That is, when the transmission axes or the absorption axes of the polarizing films are defined as "optical axes", the optical axis of the polarizing film 24 and the optical axis of the polarizing film 14 can be parallel or perpendicular to the rubbing direction.

In the liquid crystal display device 100 having the above-mentioned configuration, by supplying an image signal (voltage) to the pixel electrode 9 through the TFT 30, an electric field in the substrate plane direction is generated between the pixel electrode 9 and the common electrode 19 and the liquid crystal is driven by the electric field. The transmittance is made to vary every sub pixel area to make a display. That is, in the state where a voltage is not applied to the pixel electrode 9, the liquid crystal molecules of the liquid crystal layer 50 are horizontally aligned in a direction (direction parallel to the x axis) parallel to the rubbing direction. When the electric field in the direction perpendicular to the extension direction of the band-like electrodes 9c and 9d of the pixel electrode 9 is generated in the liquid crystal layer 50 by the use of the pixel electrode 9 and the common electrode 19, the liquid crystal molecules are aligned in the direction.

The light emitted from the lighting device 90 is converted into linearly-polarized light parallel to the transmission axis of the polarizing film 14 by passing through the polarizing film 14 and is incident on the liquid crystal layer 50. When the liquid crystal layer 50 is in the OFF state (non-selected state), the linearly-polarized light incident on the liquid crystal layer 50 is emitted from the liquid crystal layer 50 in the same polarized state as the incident light. The linearly-polarized light is absorbed by the polarizing film 24 having the transmission axis perpendicular to the linearly-polarized light and the sub pixel area displays darkness. On the other hands when the liquid crystal layer 50 is in the ON state (selected state), the linearly-polarized light incident on the liquid crystal layer 50 is made to have a predetermined phase difference (a half wavelength) by the liquid crystal layer 50, is converted into linearly-polarized light rotating from the incident polarization direction by 90°, and then is emitted from the liquid crystal layer 50. Since the linearly-polarized light is parallel to the transmission axis of the polarizing film 24, the linearly-polarized light passes through the polarizing film 24 and is viewed as display light, whereby the sub pixel area displays brightness. As a result, a liquid crystal display device employing a normally-black mode is provided.

As shown in FIG. 4, the alignment films 18 and 28 opposed to each other with the liquid crystal layer 50 interposed therebetween are subjected to the rubbing process in the same direction in a plan view. Accordingly, in the state where a voltage is not applied to the pixel electrode 9, the liquid crystal molecules of the liquid crystal layer 50 are horizontally aligned in the rubbing direction 151 between the substrates 10 and 20. When the electric field generated between the displaying pixel electrode 9A and the common electrode 19 is made to act on the liquid crystal layer 50, the liquid crystal molecules 50a are aligned in the width direction of the band-like electrodes 9c shown in FIG. 2. The displaying sub pixels DR, DG, and DB display brightness and darkness using a birefringence characteristic based on a variation in alignment of the liquid crystal molecules 50a.

Figure 5:
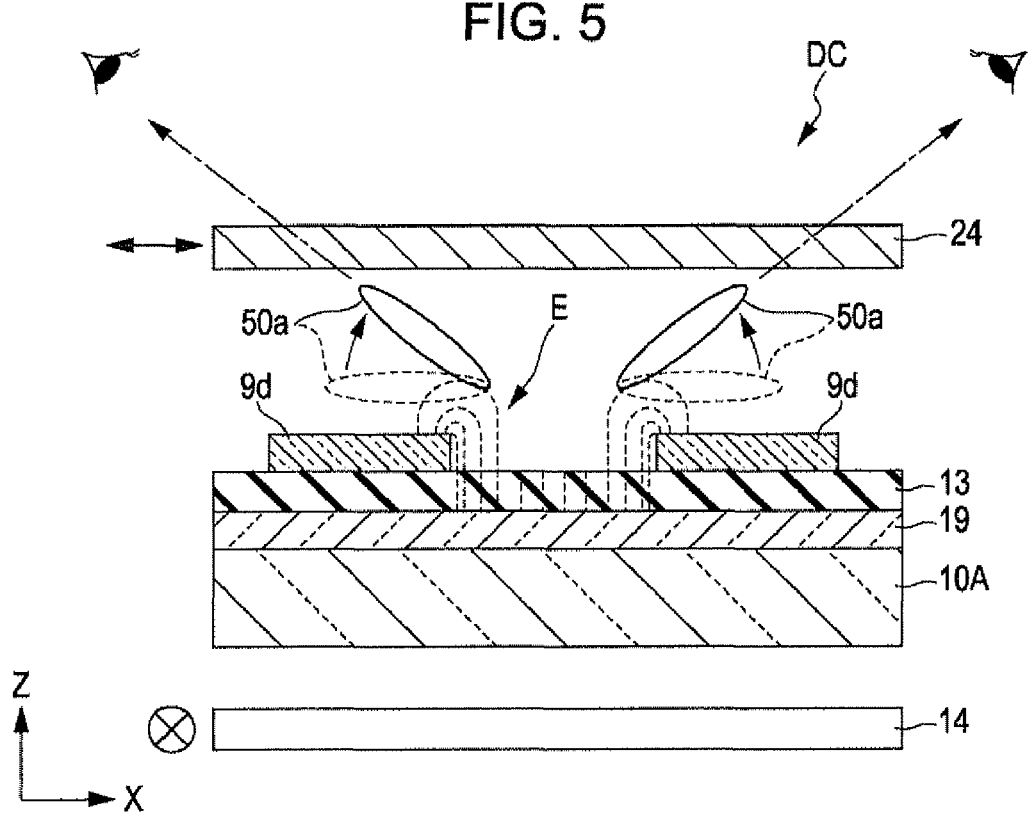
FIG. 5 is a diagram illustrating alignment statuses of liquid crystal molecules in a viewing angle control sub pixel.

On the other hand, in the viewing-angle controlling sub pixel DC, the main direction 157 of the electric field is parallel to the rubbing direction 151. Accordingly, even when the electric field generated between the viewing-angle controlling pixel electrode 9B and the common electrode 19 is made to act thereon, the variation in alignment in the substrate plane (in the XY plane) does not occur. However, as shown in FIG. 5, since the electric field E has an electric field component in the tilt direction about the substrate plane, the variation in alignment is caused in the plane (XZ plane) including the axis (X axis) parallel to the rubbing direction and the substrate normal line (Z axis). Since the variation in alignment does not influence the image display in the substrate normal line direction but contributes to the variation in birefringence rate of light emitted in the tilt direction, it influences the contrast (visibility) of an image as viewed in the tilt direction. The viewing-angle controlling sub pixel DC controls the visibility of an image in the wide-angle direction using the birefringence characteristic based on the variation in alignment of the liquid crystal molecules 50a.

However, since the electric field acting on the viewing-angle controlling sub pixel DC is almost parallel to the substrate plane, the alignment control performance is smaller than that of the displaying sub pixels. Accordingly, it is not possible to completely suppress the display in the wide-angle direction by using only the viewing-angle controlling sub pixel DC. Therefore, in this embodiment, the intensity of light emitted from the viewing-angle controlling sub pixel DC is made to be different position by position in the image display area and plural patterns having different intensity (brightness) of light passing through the liquid crystal layer 50 are displayed in the image display area, more accurately, in the viewing angle control area including the plural viewing-angle controlling sub pixels DC (viewing-angle controlling pixel electrodes 9B) arranged in a matrix. An example of a method of controlling the light intensity of the viewing-angle controlling sub pixel DC will be described now.

(1) Method of Controlling Magnitude of Driving Voltage

By controlling the magnitude of a driving voltage supplied to the viewing-angle controlling sub pixel DC, plural patterns (bright and dark patterns) having different brightness can be formed in the image display area. The switching of the driving voltage supply may be performed every unit, each of which includes plural viewing-angle controlling sub pixels. In the liquid crystal display device 100 according to this embodiment, since the TFT 30 is disposed in the respective viewing-angle controlling sub pixels DC, the magnitude of the driving voltage or the switching of the driving voltage supply can be controlled every viewing-angle controlling sub pixel DC.

(2) Method of Controlling Thickness of Liquid Crystal Layer

The voltage-transmittance characteristic of the liquid crystal layer varies depending on the thickness of the liquid crystal layer. Accordingly, by controlling the thickness of the liquid crystal layer every viewing-angle controlling sub pixel DC, it is possible to form bright and dark patterns in the image display area. In this case, even when the driving voltage is made to vary by the viewing-angle controlling sub pixels DC, it is possible to form the bright and dark patterns. Therefore, since the driving voltage of the viewing-angle controlling sub pixels DC can be used in common, it is possible to simplify a driving circuit and to reduce the number of wirings from the driving circuit to the image display area.

The thickness of the liquid crystal layer can be controlled by the use of a liquid-crystal-layer thickness adjusting layer disposed on the TFT array substrate 10 or the counter substrate 20. An overcoating layer formed on the color filter layer 22 can be used as the liquid-crystal-layer thickness adjusting layer. The overcoating layer covering the surfaces of the coloring layers 22R, 22G, and 22B are usually disposed in the color filter layer 22. Although not shown in FIGS. 3A and 3B, it is possible to control the thickness of the liquid crystal layer 50 by the viewing-angle controlling sub pixels DC by controlling the thickness of the overcoating layer every viewing-angle controlling sub pixel DC.

The thickness of the overcoating layer can be controlled by an etching process. When the overcoating layer is formed of a photosensitive material, the thickness of the overcoating layer may be controlled by controlling the intensity of exposure light applied to the photosensitive material. For example, when an exposure process is performed using an exposure mask (gray-scale mask) having partially different transmittance, it is possible to form an overcoating layer including a large-thickness portion having a large thickness and a small-thickness portion having a small thickness by once exposure process.

(3) Method of Controlling Thickness of Insulating Film Between Viewing-angle Controlling Pixel Electrode and Common Electrode The voltage-transmittance characteristic of the liquid crystal layer varies depending on the thickness of the second interlayer insulating film 13 disposed between the viewing-angle controlling pixel electrodes 9B and the common electrode 19. Accordingly, by controlling the thickness of the second interlayer insulating film 13 by the viewing-angle controlling sub pixels DC, it is possible to form bright and dark patterns in the image display area. In this case, even when the driving voltage is made to vary by the viewing-angle controlling sub pixels DC, it is possible to form the bright and dark patterns. Therefore, since the driving voltage of the viewing-angle controlling sub pixels DC can be used in common, it is possible to simplify the driving circuit and to reduce the number of wirings from the driving circuit to the image display area.

(4) Method of Changing Ratio L/S of Band-like Electrode by Areas

The voltage-transmittance characteristic of the liquid crystal layer varies depending on a ratio L/S of the width L of the band-like electrodes 9d and the width S of the slits Sc between the band-like electrodes 9d. By controlling the ratio L/S by the viewing-angle controlling sub pixels DC, it is possible to form bright and dark patterns in the image display area. In this case, even when the driving voltage is made to vary by the viewing-angle controlling sub pixels DC, it is possible to form the bright and dark patterns. Therefore, since the driving voltage of the viewing-angle controlling sub pixels DC can be used in common, it is possible to simplify the driving circuit and to reduce the number of wirings from the driving circuit to the image display area.

Figure 6:
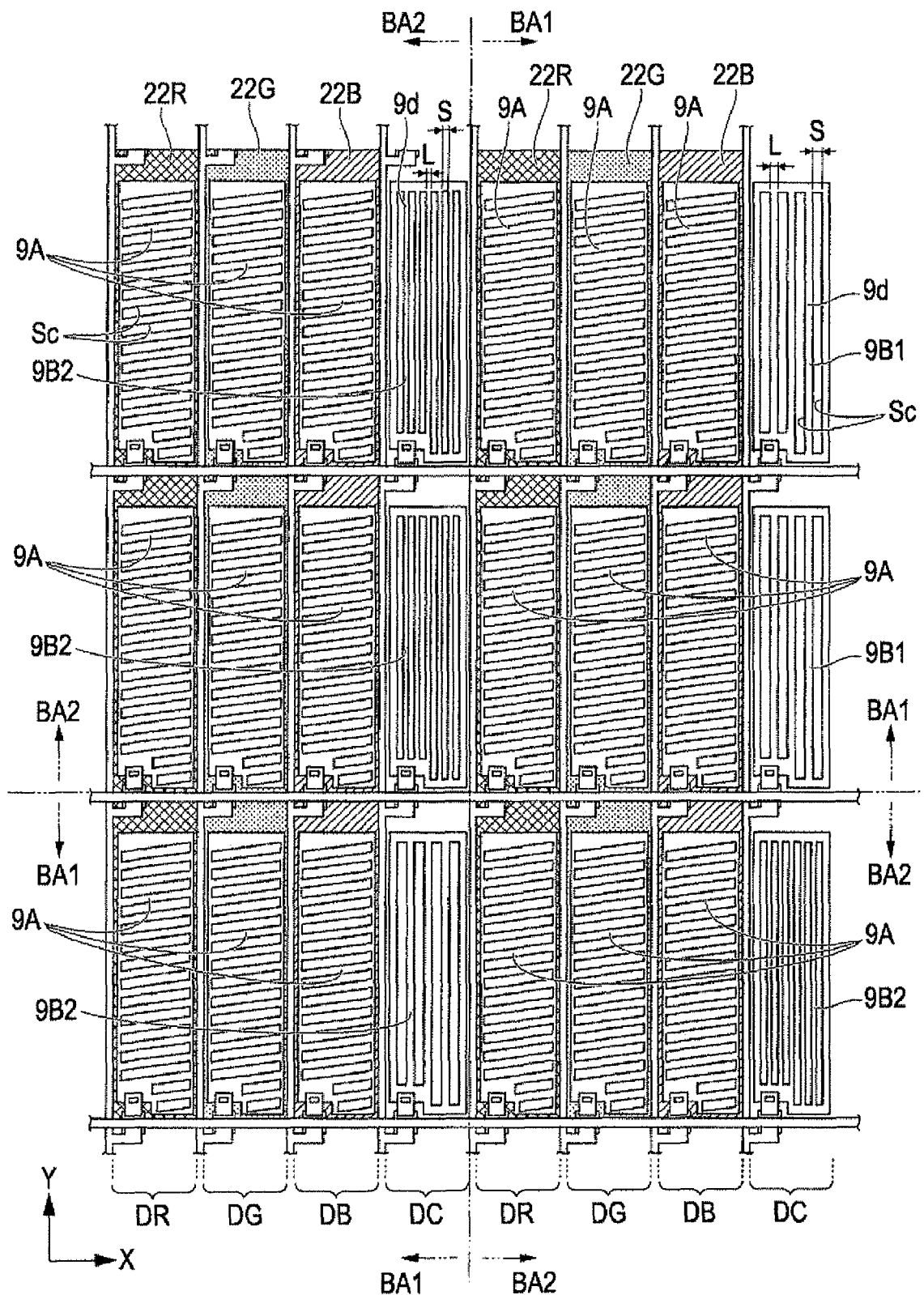
FIG. 6 is a plan view illustrating plural pixels in the liquid crystal display device according to the first embodiment of the invention.

FIG. 6 is a plan view illustrating the liquid crystal display device including plural band-like electrodes 9d having different ratios L/S. In FIG. 6, reference numeral 9B1 represents a viewing-angle controlling pixel electrode having the band-like electrodes 9d with a small ratio L/S and reference numeral 9B2 represents a viewing-angle controlling pixel electrode having the band-like electrodes 9d with a great ratio L/S. In two pixels on the upper-right side of the drawing and one pixel on the lower-left side (hereinafter, an area including these pixels is referred to as area BA1), the band-like electrodes 9d with a small ratio L/S are disposed in the viewing-angle controlling sub pixels DC. On the other hand, in two pixels on the upper-left side of the drawing and one pixel on the lower-right side (hereinafter, an area including these pixels is referred to as area BA2), the band-like electrodes 9d with a great ratio L/S are disposed in the viewing-angle controlling sub pixels DC. Accordingly, the intensity of light emitted in the tilt direction from area BA1 is different from the intensity of light emitted in the tilt direction from area BA2, thereby forming patterns having different brightness.

Figure 7A:
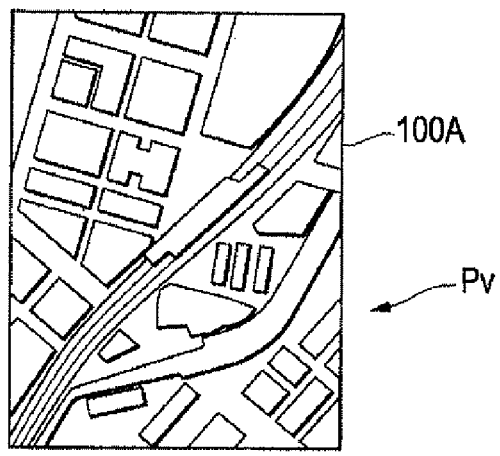
FIGS. 7A, 7B, and 7C are diagrams illustrating an example of a displayed image in a front direction and a wide angle direction of the liquid crystal display device according to the first embodiment of the invention.
Figure 7B:
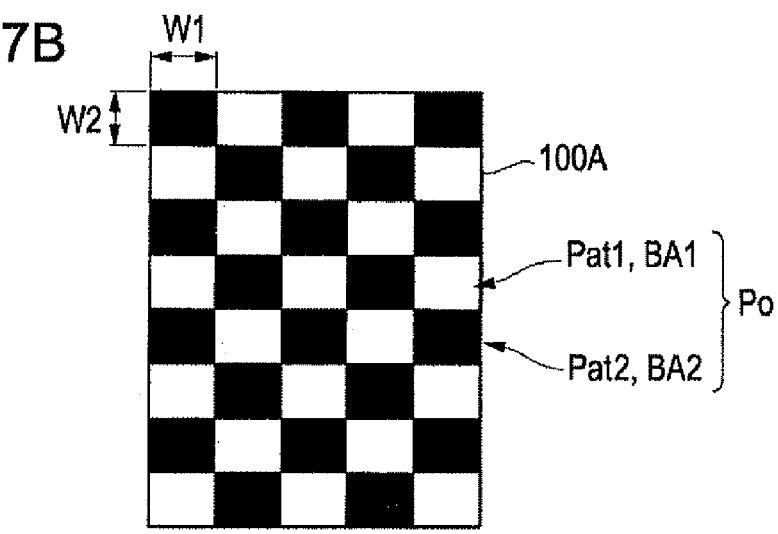
Figure 7C:
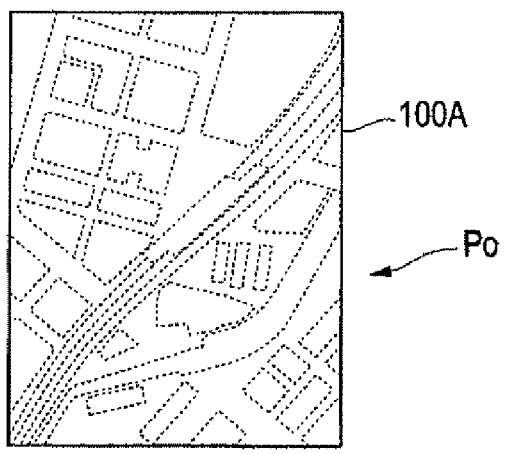

FIGS. 7A, 7B, and 7C are diagrams illustrating an example of the viewing angle control using the viewing-angle controlling sub pixels shown in FIG. 6. FIG. 7A is a diagram illustrating image Pv as viewed in the front direction (direction substantially parallel to the substrate normal line), FIG. 7B is a diagram illustrating image Po as viewed in the wide-angle direction (direction tilted from the substrate normal line), and FIG. 7C is a diagram illustrating image Po as a known liquid crystal display device is viewed in the wide-angle direction. In the drawings, reference numeral 100A represents an image display area of the liquid crystal display device.

In the known liquid crystal display device shown in FIG. 7C, light is emitted with uniform intensity from all the viewing-angle controlling sub pixels to reduce the contrast of image Pv. In this method, by forming an entire-white image with the viewing-angle controlling sub pixels and overlapping the formed image with image Pv formed with the displaying sub pixels, the visibility of image Pv is reduced. However, the intensity of light emitted from the viewing-angle controlling sub pixels is small. Accordingly, when the intensity of display light emitted at a wide angle is great, the image displayed with the displaying sub pixels is dimly floated in the white display made with the viewing-angle controlling sub pixels, thereby not accomplishing the sufficient viewing angle control effect.

On the other hand, in the liquid crystal display device according to this embodiment, as shown in FIG. 7B, the image (viewing-angle controlling image) having plural patterns Pat1 and Pat2 with different brightness is overlapped with image Pv. In this method, the outline of image Pv is dimmed by the overlapping patterns Pat1 and Pat2 and the visibility of image Pv is more reduced than that of the case where the entire-white image is overlapped. That is, in the known method, since the light emitted from the viewing-angle controlling sub pixels has uniform brightness, the brightness of the image as a whole increases and the contrast of image Pv is reduced, but the outline of the image in the wide-angle direction maintains the original shape. On the contrary, in the liquid crystal display device according to this embodiment, the gray scale of image Pv varies by areas overlapped with the patterns Pat1 and Pat2 due to the overlapping bright and dark patterns Pat1 and Pat2 and particularly, the outline of image Pv is greatly dimmed at the boundaries of the patterns Pat1 and Pat2.

In FIG. 7B, each of the patterns Pat1 and Pat2 preferably have a size visible with naked eyes. Here, the expression of "visible with naked eyes" means that it is visible when an observer directly views the entire screen in a normal use and excludes a case where a part of the image display area is enlarged and observed with a microscope, etc. By setting the size to be visible with the naked eyes, the attention of the observer can be attracted with the shape of the patterns Pat1 and Pat2, thereby further deteriorating the visibility of the image Pv.

Here, 2 mm is assumed as the size visible with the naked eyes. In spite of individual differences, the size of about 2 mm is considered as being clearly visible with the naked eyes. When the sizes of the patterns Pat1 and Pat2 are too great, the effect of causing the outline or color to be dim is reduced, which is not desirable. Therefore, it is preferable that the maximum size of pattern is limited to a predetermined size (for example, 20 mm or less) and plural patterns are displayed in that range. In FIG. 7B, by allowing the patterns Pat1 and Pat2 to have a rectangular pattern of the same shape and arranging the patterns to cross each other, a checker pattern (checkers shape) is displayed. The lengths W1 and W2 of the sides of the patterns Pat1 and Pat2 are both in the range of 2 mm to 20 mm. Plural pixels are disposed in each of the patterns Pat1 and Pat2 and the intensity (brightness) of light emitted from the viewing-angle controlling sub pixels varies depending on the areas including the plural pixels.

Although the checker pattern is displayed as the viewing-angle controlling image in FIG. 7B, the viewing-angle controlling image is not limited to the checker pattern. For example, stripe patterns (stripe shapes) in which plural line-like patterns having different magnitudes of brightness are alternately arranged in one direction may be employed. In this case, it is preferable that the width of the line-like patterns is in the range of 2 mm to 20 mm. An image in which patterns other than a rectangle such as a circle or a triangle are arranged with a constant period may be employed as the viewing-angle controlling image. In addition, an image not including periodic patterns such as a photograph may be employed as the viewing-angle controlling image.

Although the FFS liquid crystal display device is described in this embodiment, the above-mentioned configuration may be applied to a transverse electric field system such as an IPS (In-Plane Switching) system. Even when the FFS liquid crystal display device is employed, the common electrode 19, the interlayer insulating film 13, and the pixel electrodes 9 are sequentially stacked from the substrate body 10A in this embodiment, but the order of the pixel electrodes 9 and the common electrode 19 may be reversed so that the pixel electrodes 9, the interlayer insulating film 13, and the common electrode 19 may be sequentially stacked from the substrate body 10A. In this case, the band-like electrodes are formed in the common electrode 19 which is an electrode close to the liquid crystal layer 50.

Although the viewing-angle controlling sub pixels DC are disposed in the pixels PX, respectively, in this embodiment, one viewing-angle controlling sub pixel DC may be disposed every unit which includes plural pixels or plural sub pixels. In this case, the viewing-angle controlling sub pixels DC (viewing-angle controlling pixel electrode 9B) are preferably arranged in the image display area with a constant gap. According to this configuration, the viewing-angle controlling sub pixels DC can be arranged uniformly in the entire image display area. Accordingly, a problem that the viewing-angle control performance is deteriorated in a specific area does not occur.

Second Embodiment

Figure 8:
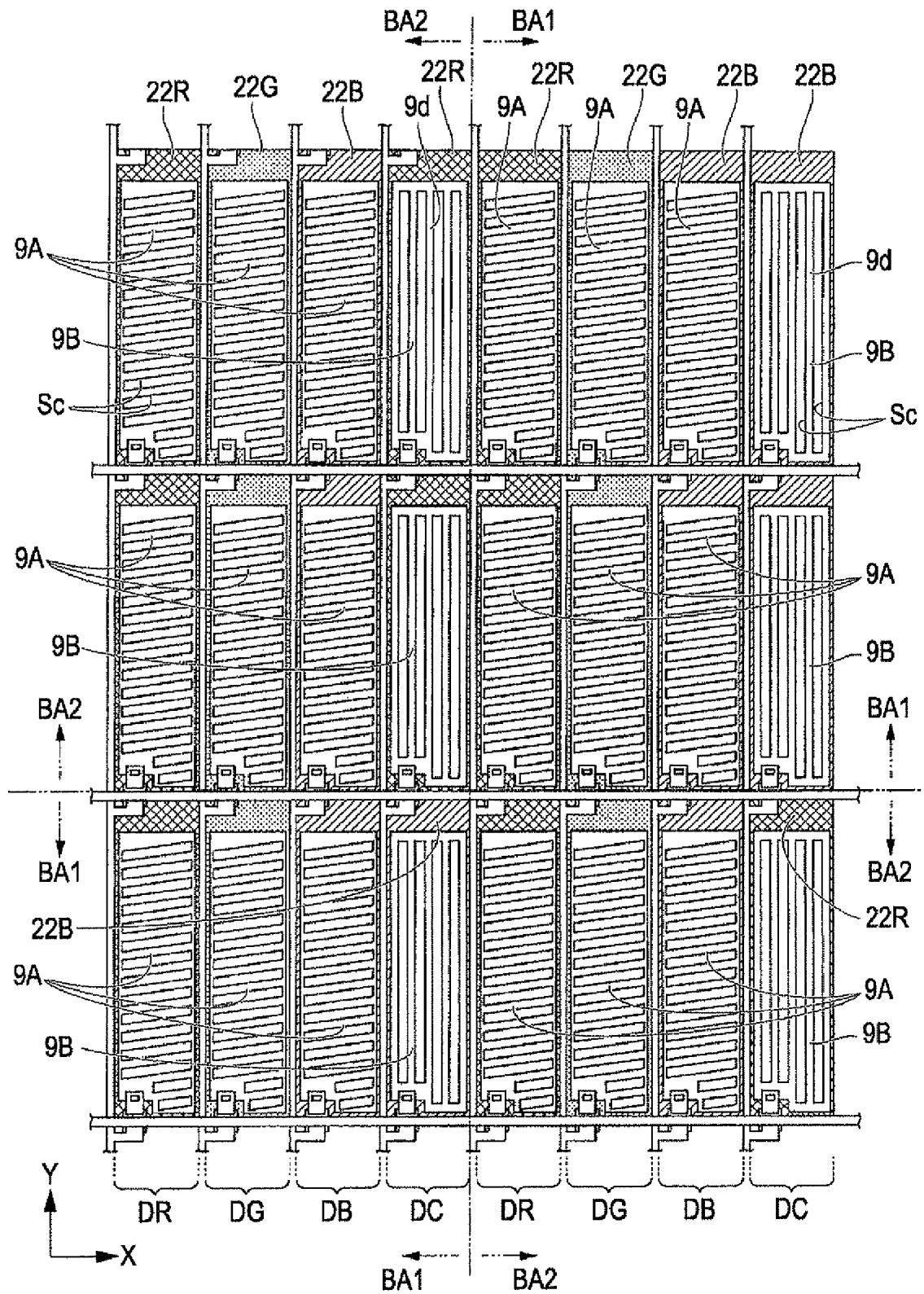
FIG. 8 is a plan view illustrating plural pixels in a liquid crystal display device according to a second embodiment of the invention.

FIG. 8 is a plan view illustrating a liquid crystal display device according to a second embodiment of the invention. In this embodiment, elements common to the first embodiment are denoted by like reference numerals and detailed description thereof will be omitted.

In the liquid crystal display device according to the first embodiment, by controlling the intensity of light emitted from the viewing-angle controlling sub pixels DC by the viewing-angle controlling sub pixels DC, plural patterns having different brightness are displayed in the image display area. In this embodiment, plural patterns having different colors of light instead of different brightness are displayed. Specifically, one coloring layer of the red coloring layer 22R, the green coloring layer 22G, and the blue coloring layer 22B is selected and disposed in each viewing-angle controlling sub pixel DC.

In the example shown in FIG. 8, in two pixels on the upper-right side of the drawing and one pixel on the lower-left side (hereinafter, an area including these pixels is referred to as area BA1), a blue coloring layer 22B is disposed in the viewing-angle controlling sub pixels DC. On the other hand, in two pixels on the upper-left side of the drawing and one pixel on the lower-right side (hereinafter, an area including these pixels is referred to as area BA2), a red coloring layer 22R is disposed in the viewing-angle controlling sub pixels DC. The viewing-angle controlling sub pixel DC in area BA1 and the viewing-angle controlling sub pixel DC in area BA2 have the same voltage-transmittance characteristic. That is, the conditions of (1) the magnitude of a driving voltage, (2) the thickness of a liquid crystal layer, (3) the thickness of the second interlayer insulating film disposed between the viewing-angle controlling pixel electrodes and the common electrode, and (4) the ratio L/S of the band-like electrodes are the same in the viewing-angle controlling sub pixels DC of area BA1 and the viewing-angle controlling sub pixels DC of area BA2. In this case, even when the driving voltage is not made to vary depending on the viewing-angle controlling sub pixels DC, it is possible to form red and blue colored patterns. Therefore, since the driving voltage of the viewing-angle controlling sub pixels DC can be used in common, it is possible to simplify the driving circuit and to reduce the number of wirings from the driving circuit to the image display area.

Although the coloring layer is disposed in both of area BA1 and area BA2 in FIG. 8, the coloring layer can be disposed in one of area BA1 and BA2 (that is, some viewing-angle controlling sub pixels of the plural viewing-angle controlling sub pixels disposed in the image display area) and need not be disposed in both of area BA1 and area BA2. The viewing-angle controlling sub pixels in which the coloring layer is not disposed display the same white light as the illumination light.

Figure 9A:
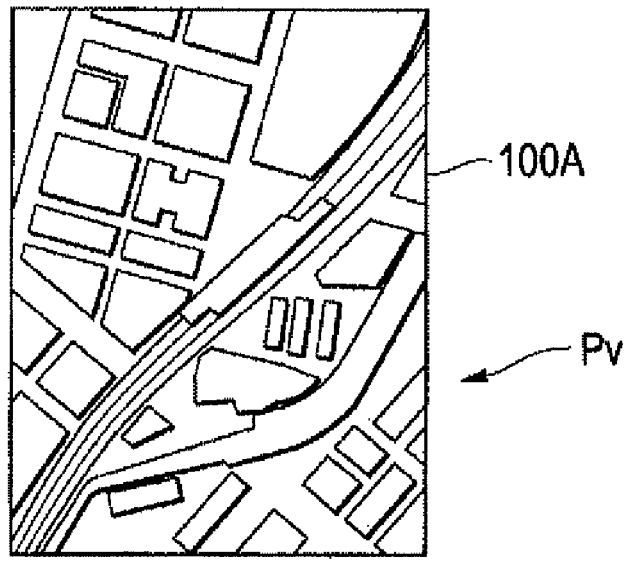
FIGS. 9A and 9B are diagrams illustrating an example of a displayed image in a front direction and a wide angle direction of the liquid crystal display device according to the second embodiment of the invention.
Figure 9B:
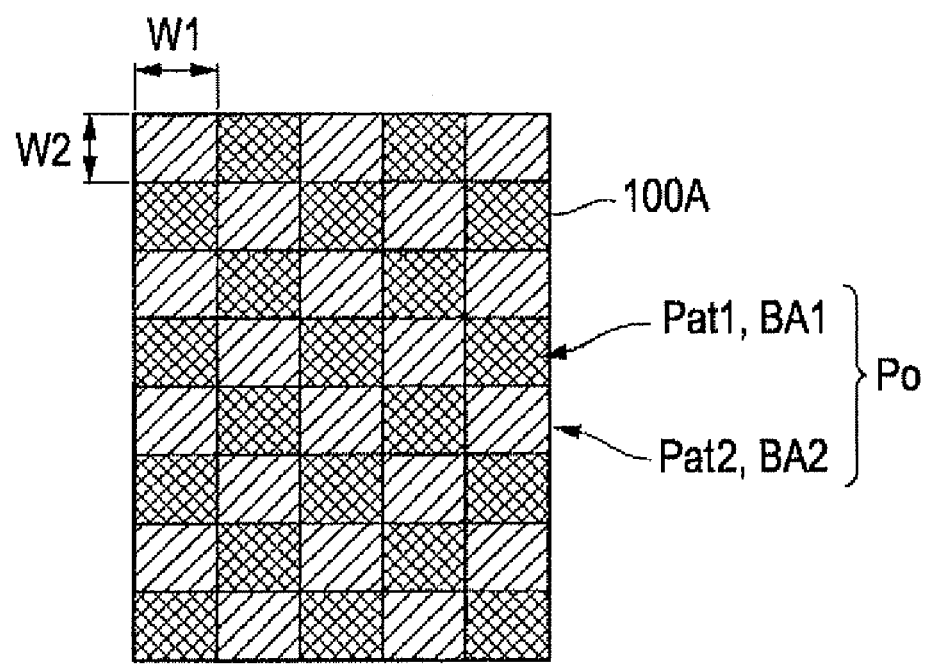

FIGS. 9A and 9B are diagrams illustrating the viewing angle control using the viewing-angle controlling sub pixels shown in FIG. 8. FIG. 9A is a diagram illustrating image Pv as viewed in the front direction and FIG. 9B is a diagram illustrating image Po as viewed in the wide-angle direction. In the drawings, reference numeral 100A represents the image display area of the liquid crystal display device.

In the liquid crystal display device according to this embodiment, an image (viewing-angle controlling image) including plural patterns Pat1 and Pat2 having different colors is overlapped with image Pv. Accordingly, the outline of image Pv is dimmed and the visibility of image Pv is deteriorated. This is because the color of image Pv varies depending on areas where the patterns Pat1 and Pat2 overlap due to the overlapping patterns Pat1 and Pat2.

In FIG. 9B, it is preferable that each of the patterns Pat1 and Pat2 has a size (for example, a size of about 2 mm) visible with the naked eyes. In FIG. 9B, by allowing the patterns Pat1 and Pat2 to have a rectangular pattern of the same shape and arranging the patterns to cross each other, a checker pattern (checkers shape) is displayed. The lengths W1 and W2 of the sides of the patterns Pat1 and Pat2 are both in the range of 2 mm to 20 mm. Plural pixels are disposed in each of the patterns Pat1 and Pat2 and the colors (colors of the coloring layers disposed in the viewing-angle controlling sub pixels) of light emitted from the viewing-angle controlling sub pixels varies depending on the areas including the plural pixels.

Although the checker pattern is displayed as the viewing-angle controlling image in FIG. 9B, the viewing-angle controlling image is not limited to the checker pattern. For example, stripe patterns (stripe shapes) in which plural line-like patterns having different colors are alternately arranged in one direction may be employed. In this case, it is preferable that the width of the line-like patterns is in the range of 2 mm to 20 mm. An image in which patterns other than a rectangle such as a circle or a triangle are arranged with a constant period may be employed as the viewing-angle controlling image. In addition, an image not including periodic patterns such as a photograph may be employed as the viewing-angle controlling image.

Third Embodiment

Figure 10:
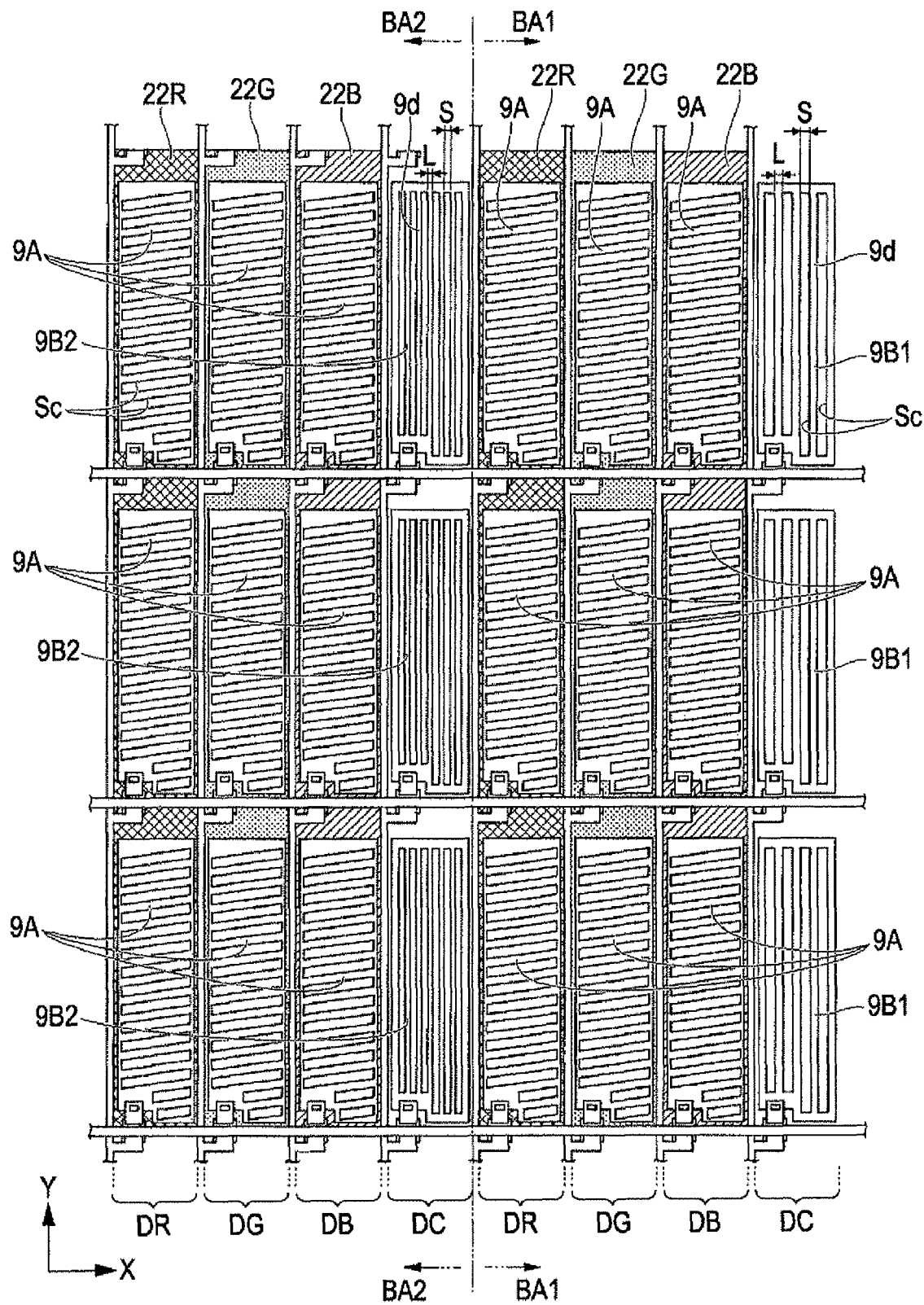
FIG. 10 is a plan view illustrating plural pixels in a liquid crystal display device according to a third embodiment of the invention.

FIG. 10 is a plan view illustrating a liquid crystal display device according to a third embodiment of the invention. In this embodiment, elements common to the first embodiment are denoted by like reference numerals and detailed description thereof will be omitted.

This embodiment is different from the first embodiment, in the shape of the viewing-angle controlling image. In this embodiment, an image including stripe patterns is used as the viewing-angle controlling image. In the example shown in FIG. 10, in three pixels on the right side of the drawing (hereinafter, an area including these pixels is referred to as area BA1), the band-like electrodes 9d with a small ratio L/S are disposed in the viewing-angle controlling sub pixels DC. On the other hand, in three pixels on the left side of the drawing (hereinafter, an area including these pixels is referred to as area BA2), the band-like electrodes 9d with a great ratio L/S are disposed in the viewing-angle controlling sub pixels DC. Accordingly, the intensity of light emitted in the tilt direction varies in area BA1 and area BA2 and thus patterns having different brightness are formed.

Although the ratio L/S of the band-like electrodes varies in area BA1 and BA2 in this embodiment, at least one condition of (1) the magnitude of a driving voltage, (2) the thickness of a liquid crystal layer, (3) the thickness of the second interlayer insulating film disposed between the viewing-angle controlling pixel electrodes and the common electrode, and (4) the ratio L/S of the band-like electrodes can vary in the viewing-angle controlling pixel electrodes 9B1 of area BA1 and the viewing-angle controlling pixel electrodes 9B2 of area BA2.

Fourth Embodiment

Figure 11:
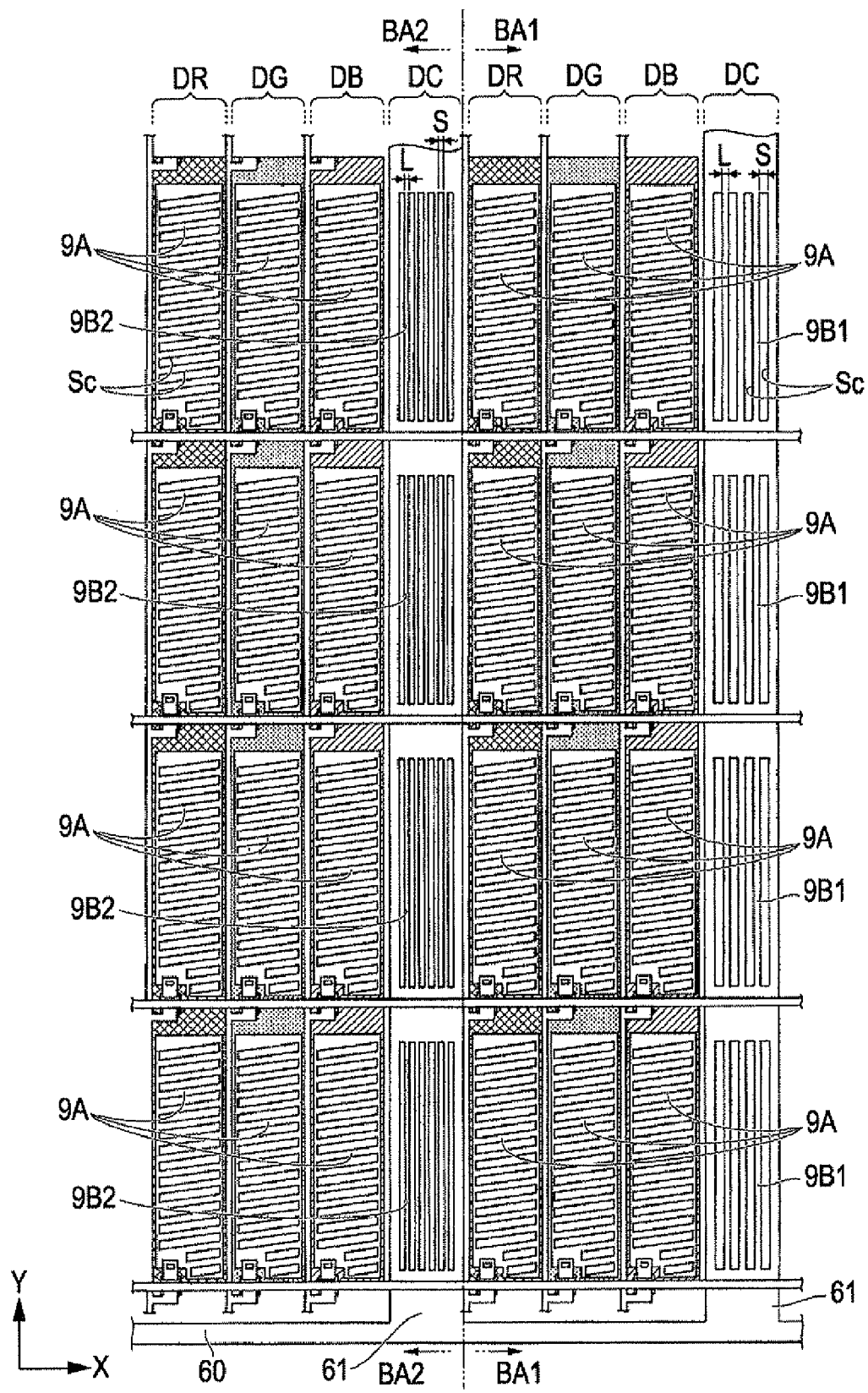
FIG. 11 is a plan view illustrating plural pixels in a liquid crystal display device according to a fourth embodiment of the invention.

FIG. 11 is a plan view illustrating a liquid crystal display device according to a fourth embodiment of the invention. In this embodiment, elements common to the third embodiment are denoted by like reference numerals and detailed description thereof will be omitted.

In the liquid crystal display device according to the third embodiment, the TFT is connected to each viewing-angle controlling pixel electrode and can be driven every viewing-angle controlling sub pixel DC. On the contrary, in this embodiment, all the viewing-angle controlling pixel electrodes in the image display area are connected to and all the viewing-angle controlling sub pixels are driven by one voltage switching element. Specifically, plural viewing-angle controlling pixel electrodes disposed in a direction (Y axis direction) perpendicular to the arrangement axis (X axis) of the plural sub pixels DR, DG, DB, and DC in one pixel are connected to each other to form a stripe-like viewing-angle controlling pixel electrode 61 corresponding to one line and extending in the Y axis direction. Plural stripe-like viewing-angle controlling pixel electrodes 61 are formed along the arrangement axis and the plural stripe-like viewing-angle controlling pixel electrodes 61 are connected to each other by a connection electrode 60 disposed on the periphery of the image display area. The connection electrode 60 can be disposed on at least one side of the rectangular image display area, but may be formed in four sides in a frame shape. A voltage switching element (not shown) common to the viewing-angle controlling pixel electrodes 61 are connected to the connection electrode 60. The switching of the driving voltage supply (that is, the switching of wideness and narrowness of the viewing angle) to all the viewing-angle controlling sub pixels DC is controlled in a bundle by the voltage switching element.

In FIG. 11, to display a stripe pattern, at least one condition of (1) the magnitude of a driving voltage, (2) the thickness of a liquid crystal layer, (3) the thickness of the second interlayer insulating film disposed between the viewing-angle controlling pixel electrodes and the common electrode, and (4) the ratio L/S of the band-like electrodes can vary in the viewing-angle controlling sub pixels DC of area BA1 and the viewing-angle controlling sub pixels DC of area BA2.

The bright and dark pattern is not limited to the stripe pattern. The checker pattern may be displayed similarly to the first embodiment. When the checker pattern is displayed, at least one condition of the viewing-angle controlling sub pixels DC of (1) the magnitude of a driving voltage, (2) the thickness of a liquid crystal layer, (3) the thickness of the second interlayer insulating film disposed between the viewing-angle controlling pixel electrodes and the common electrode, and (4) the ratio L/S of the band-like electrodes can vary depending on the rectangular areas including plural pixels. When the checker pattern is displayed, the plural viewing-angle controlling pixel electrodes arranged in the Y axis direction are connected to each other to form a stripe-like viewing-angle controlling pixel electrode extending in the Y axis direction. By connecting the plural stripe-like viewing-angle controlling pixel electrodes arranged in the X axis direction to each other with the connection electrode, all the viewing-angle controlling pixel electrodes can be driven in a bundle.

Although all the viewing-angle controlling sub pixels are driven in a bundle with one voltage switching element 62 in this embodiment, the driving method of the viewing-angle controlling sub pixels is not limited to the method. For example, instead of connecting the viewing-angle controlling pixel electrode 61 to each other with the connection electrode 60, a voltage switching element 62 may be disposed in each viewing-angle controlling pixel electrode 61. In addition, instead of driving the plural viewing-angle controlling sub pixels one-dimensionally arranged in the Y axis as one unit, plural viewing-angle controlling sub pixels two-dimensionally arranged in the X axis direction and the Y axis direction may be driven as one unit and one voltage switching element may be connected to each unit.

Fifth Embodiment

Figure 12:
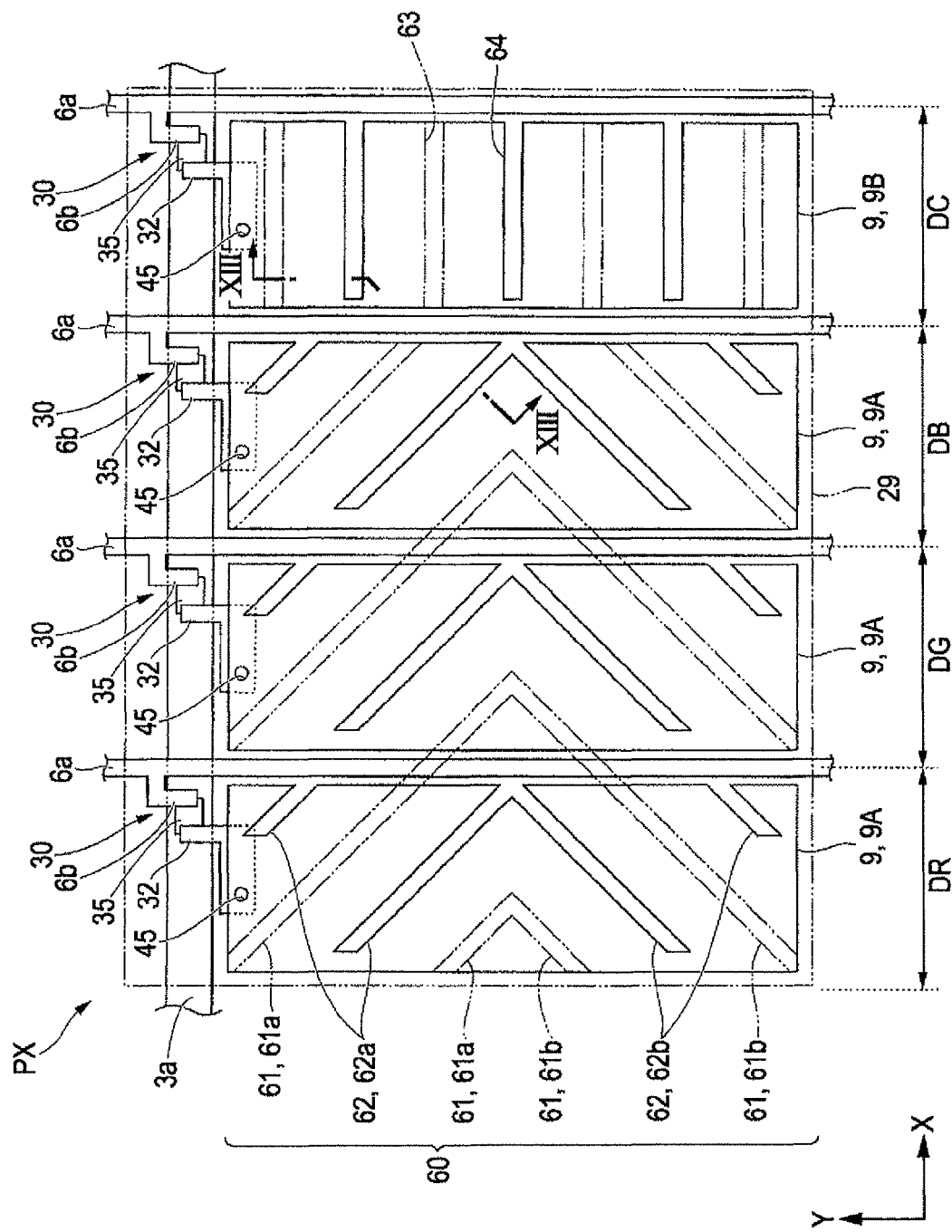
FIG. 12 is a plan view illustrating a pixel in a liquid crystal display device according to a fifth embodiment of the invention.

FIG. 12 is a plan view illustrating a pixel PX of an image display area in a liquid crystal display device according to a fifth embodiment of the invention. In this embodiment, elements common to the first embodiment are denoted by like reference numerals and detailed description thereof will be omitted.

The liquid crystal display device according to this embodiment is a transmissive liquid crystal display device employing a VA (Vertical Alignment) system for displaying an image by applying an electric field in a direction substantially perpendicular to a substrate plane to the liquid crystal to control the alignment. The liquid crystal display device according to this embodiment is a color liquid crystal display device having a color filter on a substrate and has a configuration in which one pixel includes three displaying sub pixels outputting light beams of R (Red), G (Green), and B (Blue) and one viewing-angle controlling sub pixel adjacent to the displaying sub pixels.

FIG. 2 is a plan view illustrating a pixel PX in the image display area of the liquid crystal display device. The image display area of the liquid crystal display device 100 is provided with plural scanning lines 3*a* extending in the x axis direction and plural data lines 6*a* extending in the Y axis direction. Rectangular areas surrounded with the scanning lines 3*a* and the data lines 6*a* in a plan view are sub pixels DR, DG, DB, and DC and the plural sub pixels DR, DG, DB, and DC arranged in the X axis direction constitute one pixel PX.

Each pixel PX includes displaying sub pixels DR, DG, and DB contributing to the display of an image and a viewing-angle controlling sub pixel DC used to prevent the observation in a wide-angle direction (direction obliquely tilted from a substrate normal line). One coloring layer (color filter) of one color of three primary colors is disposed to correspond to one displaying sub pixel and any color display is made by three displaying sub pixels DR, DG, and DB. In this embodiment, a red displaying sub pixel DR provided with a red coloring layer, a green displaying sub pixel DG provided with a green coloring layer, and a blue displaying sub pixel DB provided with a blue coloring layer are disposed, but the viewing-angle controlling sub pixel DC is provided with no coloring layer.

The respective coloring layers are formed in a stripe shape extending in the Y axis direction, are disposed in plural sub pixels in the extension direction thereof, and are arranged periodically in the x axis direction.

The displaying sub pixels DR, DG, and DB are provided with displaying pixel electrodes 9A having a substantially rectangular shape in a plan view and being longitudinal in the Y axis direction and a common electrode 29 being disposed to two-dimensionally overlap with the displaying pixel electrodes 9A and having a beta shape in a plan view. The displaying sub pixels DR, DG, and DB are provided with dielectric protrusions 61 or slits 62 which are alignment control members (first alignment control structures) of the liquid crystal molecules.

The slits 62 are electrode openings being formed in a part of each displaying pixel electrode 9A and having a substantial band shape in a plan view. Plural (two in the drawing) first slits (first band-like portions) 62*a* having a substantial band shape in a plan view and extending in a direction forming an angle of 45° in the clockwise direction with respect to the X axis are disposed at the position overlapping with the upper half of the displaying pixel electrode 9A. Plural (two in the drawing) second slits (second band-like portions) 62*b* having a substantial band shape in a plan view and extending in a direction forming an angle of 45° in the counterclockwise direction with respect to the X axis are disposed at the position overlapping with the lower half of the displaying pixel electrode 9A. The extension directions of the first slits 62*a* and the second slits 62*b* are defined so that the gap between both becomes wider from the positive side of the X axis to the negative side.

Plural dielectric protrusions 61 having a substantial band shape in a plan view and protruding from the common electrode 29 to the liquid crystal layer are disposed on the surface of the common electrode 29 opposed to the displaying pixel electrode 9A. Plural (two in the drawing) first dielectric protrusions (first band-like portions) 61*a* having a substantial band shape in a plan view and extending in a direction forming an angle of 45° in the clockwise direction with respect to the X axis are disposed at the position overlapping with the upper half of the displaying pixel electrode 9A. Plural (two in the drawing) second dielectric protrusions (second band-like portions) 61*b* having a substantial band shape in a plan view and extending in a direction forming an angle of 45° in the counterclockwise direction with respect to the X axis are disposed at the position overlapping with the lower half of the displaying pixel electrode 9A. The extension directions of the first dielectric protrusions 61*a* and the second dielectric protrusions 61*b* are defined so that the gap between both becomes wider from the positive side of the X axis to the negative side.

The first slits 62*a* and the first dielectric protrusions 61*a* are alternately arranged with a constant gap in a direction perpendicular to their extension direction (direction forming an angle of 45° in the clockwise direction with respect to the X axis direction). The second slits 62*b* and the second dielectric protrusions 61*b* are alternately arranged with a constant gap in a direction perpendicular to their extension direction (direction forming an angle of 45° in the counterclockwise direction with respect to the X axis direction).

Each viewing-angle controlling sub pixel DC includes the displaying pixel electrode 9B having a substantially rectangular shape in a plan view and being longitudinal in the Y axis direction and the common electrode 29 having a substantial beta shape in a plan view and being disposed to two-dimensionally overlap with the viewing-angle controlling pixel electrode 9B. The viewing-angle controlling sub pixel DC further includes dielectric protrusions 63 or slits 64 which are alignment control members (second alignment control structures) of the liquid crystal molecules.

The slits 64 are electrode openings having a substantial band shape in a plan view and being formed in a part of the viewing-angle controlling pixel electrode 9B. The slits 64 are arranged in the extension direction of the data lines 6*a* with an equivalent gap. In this embodiment, three slits 64 are formed in one viewing-angle controlling pixel electrode 93. The slits 64 extend in parallel to the scanning lines 3*a* and the slits 64 are arranged in parallel to each other with a substantially equivalent width.

Plural dielectric protrusions 63 protruding from the common electrode 29 to the liquid crystal layer and having a substantial band shape in a plan view are disposed on the surface of the common electrode 29 opposed to the viewing-angle controlling pixel electrode 93. The dielectric protrusions 63 are arranged in the extension direction of the data lines 6*a* with an equivalent gap. In this embodiment, four dielectric protrusions 63 are formed in one viewing-angle controlling pixel electrode 9B. The dielectric protrusions 63 extend in parallel to the scanning lines 3*a* and the dielectric protrusions 63 are arranged in parallel to each other with a substantially equivalent width.

The slits 64 and the dielectric protrusions 63 are alternately arranged in the direction (Y axis direction) perpendicular to their extension direction with an equivalent gap therebetween.

The common electrode 29 is formed on the entire surface of the image display area and serves as an electrode common to the sub pixels. An electric field perpendicular to the substrates 10 and 20 are generated between the common electrode 29 and the pixel electrodes 9 and the alignment state of the liquid crystal molecules varies in a plane perpendicular to the substrates 10 and 20 due to the electric field. Here, since the slits 62 and 64 are formed in the pixel electrodes 9, an electric field (tilted electric field) in a direction obliquely tilted about the substrate normal line is generated in the vicinity of the slits 62 and 64. The alignment state of the liquid crystal molecules varies in the plane including an axis perpendicular to the extension direction of the slits 62 and 64 and the substrate normal line due to the tilted electric field. At this time, since the band-like dielectric protrusions 61 and 63 parallel to the slits 62 and 64 are formed on the surface of the common electrode 29, the alignment state of the liquid crystal molecules varies in the plane including the axis perpendicular to the extension direction of the dielectric protrusions 61 and 63 and the substrate normal line in the vicinity of the dielectric protrusions 61 and 63. By the alignment control effect of both the dielectric protrusions 61 and 63 and the slits 62 and 64, the alignment state of the liquid crystal molecules stably varies in the plane. In the displaying sub pixels DR, DG, and DB, since two kinds of band-like portions (first band-like portions 61a and 62a and second band-like portions 61b and 62b) extending in directions intersecting each other exist in one sub pixel area, two kinds of alignment domains (multi domains) having different alignment directions of the liquid crystal molecules are formed in one sub pixel area. Accordingly, it is possible to display an image with a wide viewing angle.

The TFTs 30 are disposed in the vicinity of the intersections of the data lines 6a and the scanning lines 3a. Each TFT 30 includes a semiconductor layer 35 formed partially in a plane area of the scanning line 3a and formed of amorphous silicon and a source electrode 6b and a drain electrode 32 formed to partially two-dimensionally overlap with the semiconductor layer 35. The scanning line 3a serves as the gate electrode of the TFT 30 at a position two-dimensionally overlapping with the semiconductor layer 35. The source electrode 6b has a substantial inverted L shape in a plan view being branched from the data line 6a and extending to the semiconductor layer 35. The pixel electrode 9 is disposed on the drain electrode 32 and a pixel contact hole 45 is formed at a position where both two-dimensionally overlap with each other. The drain electrode 32 and the pixel electrode 9 are electrically connected to each other through the pixel contact hole 45.

Figure 13:
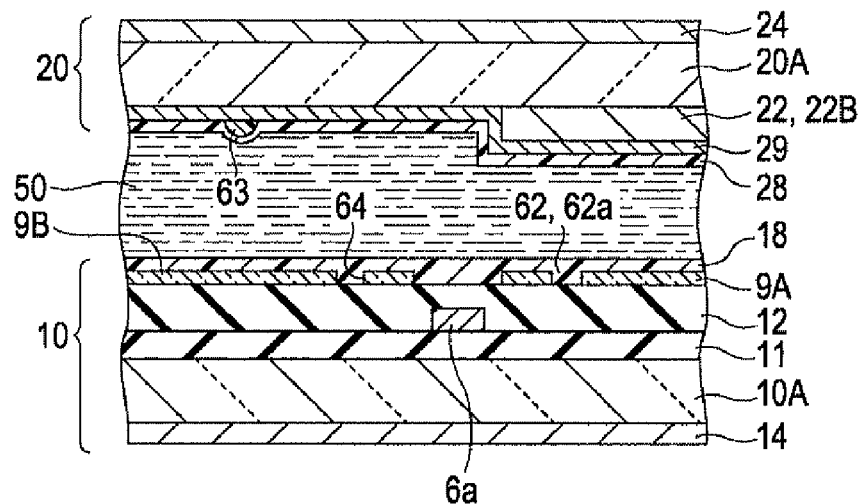
FIG. 13 is a sectional view taken along line XIII-XIII' of FIG. 12.

FIG. 13 is a sectional view taken along line XIII-XIII' of FIG. 12. The liquid crystal display device according to this embodiment includes a TFT array substrate 10, a counter substrate 20 opposed to the TFT array substrate 10, a liquid crystal layer 50 interposed between the TFT array substrate 10 and the counter substrate 20, a first polarizing film 14 disposed on the outer surface side (on the opposite side of the liquid crystal layer 50) of the TFT array substrate 10, and a second polarizing film 24 disposed on the outer surface side of the counter substrate 20. Illumination light is applied from the outer surface side of the first polarizing film 14 by a lighting device (backlight) not shown.

The TFT array substrate 10 has a light-transmitting substrate body 10A such as glass, quartz, or plastic as a base. The scanning lines (not shown) are formed on the inner surface side (side close to the liquid crystal layer 50) of the substrate body 10A and a gate insulating film 11 formed of a transparent insulating film such as silicon oxide is formed to cover the scanning lines.

The semiconductor layer (not shown) of amorphous silicon is formed on the gate insulating film 11 and the source electrodes (the data lines 6a) and the drain electrodes are disposed to be partially placed on the semiconductor layer. Although not shown, the data lines 6a are branched to the semiconductor layers and partially overlap with the semiconductor layers to form the source electrodes.

A first interlayer insulating film 12 formed of silicon oxide, etc. is formed to cover the semiconductor layers, the source electrodes (the data lines 6a), and the drain electrodes. The pixel electrodes 9 (the displaying pixel electrodes 9A and the viewing-angle controlling pixel electrodes 9B) formed of a transparent conductive material such as ITO are formed in a pattern on the first interlayer insulating film 12. The slits 62 and 64 as the alignment control members are formed in the pixel electrodes 9.

An alignment film 18 formed of polyimide, etc. is formed on the pixel electrodes 9 and the first interlayer insulating film 12. The alignment film 18 is a vertical alignment film for aligning the liquid crystal molecules of the liquid crystal layer 50 to be substantially perpendicular to the substrates in an initial alignment state where the driving voltage is not supplied to the pixel electrodes 9.

The counter substrate 20 has a light-transmitting substrate body 20A of glass, quartz, plastic, or the like as a base. Color filter layers 22 are formed at positions overlapping with the displaying pixel electrodes 9A on the inner surface side (side close to the liquid crystal layer 50) of the substrate body 20A. In the color filter layers 22, coloring layers having different colors are disposed to correspond to the displaying sub pixels. Since FIG. 13 is a sectional view illustrating boundary of the blue displaying sub pixel DB and the viewing-angle controlling sub pixel DC, a blue coloring layer 22B is disposed as the color filter layer 22.

The common electrode 29 having a beta shape in a plan view and formed of a transparent conductive material such as ITO is formed to cover the color filter layers 22 and the substrate body 20A. The dielectric protrusions 63 formed of a dielectric material such as resin are formed at positions overlapping with the pixel electrodes 9 on the surface of the common electrode 29. An alignment film 28 formed of polyimide, etc. is formed to cover the common electrode 29 and the dielectric protrusions 63. The alignment film 28 is a vertical alignment film for aligning the liquid crystal molecules of the liquid crystal layer 50 to be substantially perpendicular to the substrates in an initial alignment state where the driving voltage is not supplied to the pixel electrodes 9.

The liquid crystal layer 50 is formed of liquid crystal having negative dielectric anisotropy. The liquid crystal layer 50 at the positions (displaying sub pixels) overlapping with the displaying pixel electrodes 9A serves as a $\lambda/2$ retardation film having a phase difference of about a half a wavelength of a visible ray, in a state where an image signal (driving voltage) is supplied to the displaying pixel electrodes 9A to align the liquid crystal molecules in parallel to the substrate plane.

Arrangement relations of the optical axes of optical elements in the liquid crystal display device will be described now. The transmission axis of the polarizing film 14 is parallel to the Y axis. The transmission axis of the polarizing film 24 is parallel to the X axis. The extension direction of the first band-like portions (the first slits 62A and the first dielectric protrusions 61A) forms an angle of 45° in the clockwise direction with respect to the X axis direction. The extension direction of the second band-like portions (the second slits 62B and the second dielectric protrusions 61B) forms an angle of 45° in the counterclockwise direction with respect to the X axis direction. The extension directions of the slits 64 and the dielectric protrusions 63 disposed in the viewing-angle controlling sub pixels are parallel to the X axis.

The extension direction of the first band-like portions and the extension direction of the second band-like portions can intersect the transmission axes or the absorption axes of the polarizing films 14 and 24 at an acute angle and need not form the angle of 45° with respect to the X axis. The extension directions of the slits 64 and the dielectric protrusions 63 can be parallel to the transmission axes or the absorption axes of the polarizing films 14 and 24 and they may extend in the Y axis direction.

In the liquid crystal display device having the above-mentioned configuration, the electric field in the substrate normal line direction is generated between the pixel electrodes 9 and the common electrode 29 by supplying the image signal (voltage) to the pixel electrodes 9 through the TFTs 30 and the liquid crystal is driven using the electric field. The liquid crystal display device 100 performs a display operation by changing the transmittance every sub pixel areas.

As described above, the alignment films 18 and 28 opposed to each other with the liquid crystal layer 50 interposed therebetween are vertical alignment films for aligning the liquid crystal molecules 50a particularly to the substrates. Accordingly, in the state where a voltage is not applied to the pixel electrodes 9, the liquid crystal molecules 50a of the liquid crystal layer 50 are aligned between the substrates 10 and 20 to be perpendicular to the substrate plane. When the electric field generated between the displaying pixel electrodes 9A and the common electrode 29 is made to act on the liquid crystal layer 50, the liquid crystal molecules are tilted in the direction (the direction forming the angle of 45° in the counterclockwise direction with respect to the X axis) perpendicular to the extension direction of the first slits 62a and the first dielectric protrusions 61a and the alignment state of the liquid crystal molecules 50a varies in the plane including an axis parallel to the extension direction and the substrate normal line (Z axis) at the position overlapping with the upper half of the displaying pixel electrode 9A shown in FIG. 12. At the position overlapping with the lower half of the displaying pixel electrode 9A shown in FIG. 12, the liquid crystal molecules 50a are tilted in the direction (the direction forming the angle of 45° in the clockwise direction with respect to the X axis) perpendicular to the extension direction of the second slits 62b and the second dielectric protrusions 61b and the alignment state of the liquid crystal molecules varies in the plane including an axis parallel to the extension direction and the substrate normal line (Z axis).

In this case, since the alignment direction of the liquid crystal molecules 50a (strictly, a direction obtained by projecting the long-axis of the liquid crystal molecules 50a onto the plane parallel to the substrate plane) intersects the transmission axes of the polarizing films 14 and 24, it is possible to modulate the phase of the linearly-polarized light passing through the polarizing film 14 and to contribute to the image display in the front direction (direction substantially parallel to the substrate normal line). The displaying sub pixels DR, DG, and DB display brightness and darkness using a birefringence characteristic based on a variation in alignment of the liquid crystal molecules.

On the other hand, at the positions overlapping with the viewing-angle controlling pixel electrodes 9B, the alignment direction of the liquid crystal molecules 50a is parallel or perpendicular to the transmission axes of the polarizing films 14 and 24. Accordingly, even when the driving voltage is supplied to the viewing-angle controlling pixel electrodes 9B, the alignment state is merely made to vary in the plane (YZ plane) including an axis (Y axis) parallel to the alignment direction controlled by the alignment control structures (slits 64 and dielectric protrusions 63) and the substrate normal line (z axis) and it does not contribute to the image display in the front direction. However, since the variation in alignment of the liquid crystal molecules 50a contributes to the variation in birefringence of the light emitted in the tilt direction, it influences the contrast (visibility) of an image as viewed in the tilt direction. That is, it serves as a viewing angle control area for controlling the viewing angle in the tilt direction. The viewing-angle controlling sub pixel DC controls the visibility of an image in the wide-angle direction using the birefringence characteristic based on the variation in alignment of the liquid crystal molecules 50a.

In the liquid crystal display device according to this embodiment, the liquid crystal molecules are aligned substantially perpendicular to the substrates in the initial alignment state and then are aligned substantially parallel to the substrates by applying a voltage thereto. Accordingly, the viewing angle control effect is more excellent than that of the liquid crystal display device according to the first embodiment. However, in order to further enhance the viewing angle control effect, in this embodiment, the intensity of light emitted from the viewing-angle controlling sub pixels DC is made to vary depending on positions in the image display area and plural patterns having different intensity (brightness) of light passing through the liquid crystal layer 50 are displayed in the image display area, more accurately, in the viewing angle control area including the plural viewing-angle controlling sub pixels DC (viewing-angle controlling pixel electrodes 9B) disposed in a matrix.

The method of controlling the light intensity of the viewing-angle controlling sub pixels DC is the same as described in the first embodiment. Specifically, examples thereof can include (1) the method of controlling a magnitude of a driving voltage, (2) the method of controlling a thickness of the liquid crystal layer, (3) the method of controlling a thickness of an interlayer insulating film disposed between the viewing-angle controlling pixel electrodes and the common electrode, and (4) the method of changing the ratio L/S of the band-like electrodes depending on the areas. As described in the second embodiment, coloring layers may be disposed in the viewing-angle controlling sub pixels DC to form plural coloring patterns in the image display area. The pattern formed in the image display area is not limited to the checker pattern, but other patterns such as a stripe pattern may be employed. The patterns preferably have a size visible with naked eyes and the size is preferably in the range of 2 mm to 20 mm depending on the applications of the liquid crystal display device.

According to this configuration, an image (viewing-angle controlling image) including plural patterns having different brightness or colors is overlapped with an image in the wide-angle direction formed by the displaying pixel electrodes. Accordingly, the outline of the image is dimmed by the overlapping patterns to deteriorate the visibility of the image. In the liquid crystal display device according to this embodiment, since the alignment direction of the liquid crystal molecules of the viewing-angle controlling sub pixels DC rotates about 90°, it is possible to accomplish a more excellent viewing angle control effect than that of the liquid crystal display device according to the first embodiment.

Although the viewing-angle controlling sub pixels DC are disposed in the pixels PX, respectively, in this embodiment, one viewing-angle controlling sub pixel DC may be disposed in each unit which includes plural pixels or plural sub pixels. In this case, it is preferable that the viewing-angle controlling sub pixels DC (viewing-angle controlling pixel electrodes 9B) are arranged in the image display area with an equivalent gap. According to this configuration, it is possible to uniformly arrange the viewing-angle controlling sub pixels DC in the entire image display area. Therefore, a problem does not occur in which the viewing-angle control performance is deteriorated in a specific area.

In this embodiment, the TFTs are connected to the viewing-angle controlling pixel electrodes, respectively, to individually drive the viewing-angle controlling sub pixels DC. However, as described in the fourth embodiment, a part or all of the viewing-angle controlling pixel electrodes in the image display area may be connected to each other and one voltage switching element may be connected to the connected viewing-angle controlling pixel electrodes.

Electronic Apparatus

Figure 14:
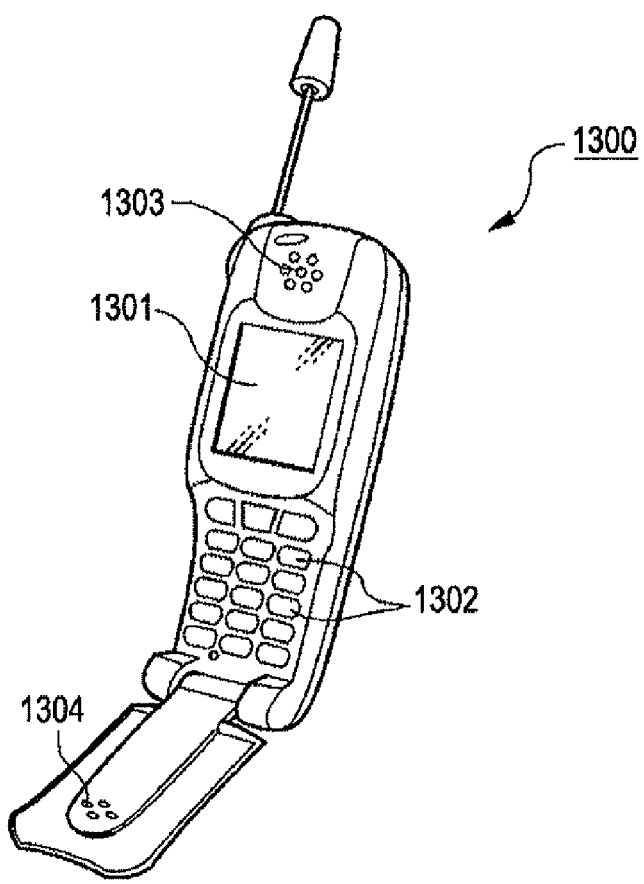
FIG. 14 is a perspective view of a mobile phone as an example of an electronic apparatus.

FIG. 14 is a perspective view illustrating a mobile phone 1300 as an example of an electronic apparatus according to the invention. The mobile phone 1300 has the liquid crystal display device according to the embodiments of the invention as a small-sized display unit 1301 and includes plural manipulation buttons 1302, an ear piece 1303, and a mouth piece 1304. Since the mobile phone 1300 includes the liquid crystal display device according to the above-mentioned embodiments, it is possible to embody an electronic apparatus having a liquid crystal display unit with an excellent function of switching the viewing angle between wide and narrow and capable of being used in various environments or applications.

The liquid crystal display device according to the above-mentioned embodiments can be suitably used as an image display unit of an electronic book, a personal computer, a digital still camera, a liquid crystal television, a view finder type or monitor direct vision-type video tape recorder, a car navigation apparatus, a pager, an electronic pocket book, a calculator, a word processor, a work station, a television phone, a POS terminal, an apparatus having a touch panel, or the like, in addition to the mobile phone, and can display an image with an excellent function of switching the viewing angle between wide and narrow in any electronic apparatus.

The entire disclosure of Japanese Patent Application No. 2008-064053, filed Mar. 13, 2008 is expressly incorporated by reference herein.

What is claimed is:

1. A liquid crystal display device comprising: a first substrate and a second substrate opposed to each other; a liquid crystal layer interposed between the first substrate and the second substrate; a plurality of displaying pixel electrodes disposed on a surface of the first substrate close to the liquid crystal layer; a plurality of viewing-angle controlling pixel electrodes disposed adjacent to the plurality of displaying pixel electrodes on the side of the first substrate close to the liquid crystal layer; a viewing angle control area controlling a viewing angle in a direction tilted from a normal line of the first substrate by the use of the plurality of viewing-angle controlling pixel electrodes; and driving circuit supplying an image signal for displaying a plurality of patterns in the viewing angle control area to the plurality of viewing-angle controlling pixel electrodes.

2. A liquid crystal display device comprising: a first substrate and a second substrate opposed to each other; a liquid crystal layer interposed between the first substrate and the second substrate; a first polarizing film disposed on a surface of the first substrate opposite to the liquid crystal layer; a second polarizing film being disposed on a surface of the second substrate opposite to the liquid crystal layer and having an optical axis perpendicular to an optical axis of the first polarizing film; a plurality of displaying pixel electrodes disposed on a surface of the first substrate close to the liquid crystal layer; a plurality of viewing-angle controlling pixel electrodes disposed adjacent to the plurality of displaying pixel electrodes on the side of the first substrate close to the liquid crystal layer; a viewing angle control area for controlling an alignment status of the liquid crystal layer in an in-plane direction including a normal line of the first substrate and the optical axis of the first polarizing film by the use of the plurality of viewing-angle controlling pixel electrodes; and driving circuit supplying an image signal for displaying a plurality of patterns in the viewing angle control area to the plurality of viewing-angle controlling pixel electrodes.

3. The liquid crystal display device according to claim 2, further comprising: a common electrode opposed to the plurality of displaying pixel electrodes and the plurality of viewing-angle controlling pixel electrodes with an insulating film interposed therebetween on the side of the first substrate close to the liquid crystal layer; a first alignment film disposed on a surface of the first substrate in contact with the liquid crystal layer; and second alignment film disposed on a surface of the second substrate in contact with the liquid crystal layer, wherein an alignment direction of the first alignment film and an alignment direction of the second alignment film are parallel to the optical axis of the first polarizing film, wherein the electrode, which is closer to the liquid crystal layer, of the viewing-angle controlling pixel electrodes and the common electrode is provided with a plurality of first band-like electrodes extending in a direction perpendicular to the optical axis of the first polarizing film at positions overlapping with the viewing-angle controlling pixel electrodes, and wherein the electrode, which is closer to the liquid crystal layer, of the displaying pixel electrodes and the common electrode is provided with a plurality of second band-like electrodes extending in a direction intersecting the optical axis of the first polarizing film at positions overlapping with the displaying pixel electrodes.

4. The liquid crystal display device according to claim 3, wherein the plurality of viewing-angle controlling pixel electrodes include a first viewing-angle controlling pixel electrode and a second viewing-angle controlling pixel electrode, and wherein a voltage-transmittance characteristic of the liquid crystal layer located at a position overlapping with the first viewing-angle controlling pixel electrode and a voltage-transmittance characteristic of the liquid crystal layer located at a position overlapping with the second viewing-angle controlling pixel electrode are different from each other.

5. The liquid crystal display device according to claim 4, wherein a ratio L/S of the width L of the first band-like electrodes to the width S of slits between the plurality of first band-like electrodes different in the first band-like electrode disposed at the position overlapping with the first viewing-angle controlling pixel electrode and the first band-like electrode disposed at the position overlapping with the second viewing-angle controlling pixel electrode.

6. The liquid crystal display device according to claim 4, wherein the thickness of the insulating film located at the position overlapping with the first viewing-angle controlling pixel electrode and the thickness of the insulating film located at the position overlapping with the second viewing-angle controlling pixel electrode are different from each other.

7. The liquid crystal display device according to claim 4, wherein a liquid-crystal-layer thickness adjusting layer allowing the thickness of the liquid crystal layer located at the position overlapping with the first viewing-angle controlling pixel electrode and the thickness of the liquid crystal layer located at the position overlapping with the second viewing-angle controlling pixel electrode to be different from each other is disposed between the first substrate and the second substrate.

8. The liquid crystal display device according to claim 1, wherein a coloring layer disposed at positions overlapping with the viewing-angle controlling pixel electrodes is provided between the first substrate and the second substrate.

9. The liquid crystal display device according to claim 4, wherein the plurality of viewing-angle controlling pixel electrodes are connected to each other and a voltage switching element switching a voltage supply is connected to the plurality of viewing-angle controlling pixel electrodes connected to each other.

10. The liquid crystal display device according to claim 1, wherein an image displayed in the viewing angle control area is an image in which the plurality of patterns having the same shape are arranged with a predetermined period.

11. An electronic apparatus comprising the liquid crystal display device according to claim 1.

* * * * *